(12) United States Patent
Tsuchiya et al.

(10) Patent No.: US 8,282,745 B2
(45) Date of Patent: Oct. 9, 2012

(54) FE-BASED SOFT MAGNETIC ALLOY AND DUST CORE USING FE-BASED SOFT MAGNETIC ALLOY

(75) Inventors: Keiko Tsuchiya, Niigata-ken (JP); Hisato Koshiba, Niigata-ken (JP); Jun Okamoto, Niigata-ken (JP); Takao Mizushima, Niigata-ken (JP)

(73) Assignee: Alps Green Devices Co., Ltd., Tokyo (JP)

( * ) Notice: Subject to any disclaimer, the term of this patent is extended or adjusted under 35 U.S.C. 154(b) by 0 days.

(21) Appl. No.: 13/180,424

(22) Filed: Jul. 11, 2011

(65) Prior Publication Data

US 2011/0265915 A1    Nov. 3, 2011

Related U.S. Application Data

(63) Continuation of application No. PCT/JP2010/050673, filed on Jan. 21, 2010.

(30) Foreign Application Priority Data

Jan. 23, 2009   (JP) .................. 2009-012542

(51) Int. Cl.
*H01F 1/153* (2006.01)
*H01F 1/147* (2006.01)

(52) U.S. Cl. ...................... 148/305; 148/121

(58) Field of Classification Search ............... None
See application file for complete search history.

(56) References Cited

U.S. PATENT DOCUMENTS

| | | | | |
|---|---|---|---|---|
| 6,083,325 | A * | 7/2000 | Bitoh et al. | 148/121 |
| 6,270,592 | B1 * | 8/2001 | Nakajima et al. | 148/306 |
| 8,007,600 | B2 * | 8/2011 | Ohta et al. | 148/121 |
| 2005/0236071 | A1 | 10/2005 | Koshiba et al. | |
| 2007/0258842 | A1 | 11/2007 | Lu et al. | |

(Continued)

FOREIGN PATENT DOCUMENTS

JP    57-185957    11/1982
(Continued)

OTHER PUBLICATIONS

Search Report dated Apr. 27, 2010 from International Application No. PCT/JP2010/050673.

(Continued)

*Primary Examiner* — John Sheehan
(74) *Attorney, Agent, or Firm* — Beyer Law Group LLP

(57) ABSTRACT

An Fe-based soft magnetic alloy includes: Fe; and a component R, wherein the component R contains at least one of P, C, B, and Si, there is a temperature difference of equal to or greater than 20° C. between a precipitation temperature of an α-Fe crystal phase and a precipitation temperature of an Fe compound, the Fe-based soft magnetic alloy is formed of a mixed-phase structure in which an amorphous phase and the α-Fe crystal phase are mixed, and a diameter of a crystallite of the α-Fe crystal phase is equal to or smaller than 50 nm, and a volume fraction of the α-Fe crystal phase to the total is equal to or lower than 40%. In addition, the composition formula is represented by $Fe_{100-x-u}J_xR_u$, a component J contains at least one of Cr, Co, Ni, and Nb, and 0 at %$\leq$x$\leq$6 at %, 17 at %$\leq$u$\leq$25 at %, and 17 at %$\leq$x+u$\leq$27.1 at % are satisfied.

14 Claims, 15 Drawing Sheets

U.S. PATENT DOCUMENTS

| | | | |
|---|---|---|---|
| 2008/0142121 A1 | 6/2008 | Koshiba et al. | |
| 2009/0266448 A1* | 10/2009 | Ohta et al. | 148/121 |
| 2010/0097171 A1* | 4/2010 | Urata et al. | 336/233 |
| 2010/0098576 A1* | 4/2010 | Yoshizawa et al. | 420/82 |
| 2010/0108196 A1* | 5/2010 | Ohta et al. | 148/121 |

FOREIGN PATENT DOCUMENTS

| | | | |
|---|---|---|---|
| JP | 63-117406 | | 5/1988 |
| JP | 7-93204 | | 10/1995 |
| JP | 8-153614 | | 6/1996 |
| JP | 2672306 | | 7/1997 |
| JP | 2002-151317 | | 5/2002 |
| JP | 2002-226956 | | 8/2002 |
| JP | 2003-213331 | | 7/2003 |
| JP | 2004-156134 | | 6/2004 |
| JP | 2005-307291 | | 11/2005 |
| JP | 2007-254814 | | 10/2007 |
| JP | 2008-169466 | | 7/2008 |
| JP | 2008-248380 | | 10/2008 |
| JP | 2009-7639 | | 1/2009 |
| JP | 2009-54615 | | 3/2009 |
| WO | WO 2008/114665 | * | 9/2008 |
| WO | WO 2008/133302 | * | 11/2008 |

OTHER PUBLICATIONS

Search Report dated Aug. 10, 2010 from International Application No. PCT/JP210/058028.

U.S. Appl. No. 13/330,420, filed Dec. 19, 2011.

* cited by examiner

DIAGRAM OF RELATIONSHIP BETWEEN
CRYSTALLIZATION RATIO AND CORE LOSS

○: Fe COMPOUND IS ALSO PRECIPITATED AS WELL AS α-Fe

DIAGRAM OF RELATIONSHIP BETWEEN
CRYSTALLITE SIZE AND CORE LOSS

○: Fe COMPOUND IS ALSO PRECIPITATED AS WELL AS α-Fe

FE-BASED SOFT MAGNETIC ALLOY AND DUST CORE USING FE-BASED SOFT MAGNETIC ALLOY

CLAIM OF PRIORITY

This application is a Continuation of International Application No. PCT/JP2010/050673 filed on Jan. 21, 2010, which claims benefit of Japanese Patent Application No. 2009-012542 filed on Jan. 23, 2009. The entire contents of each application noted above are hereby incorporated by reference.

BACKGROUND OF THE INVENTION

1. Field of the Invention

The present invention relates to an Fe-based soft magnetic alloy applied to a magnetic core (dust core) of a transformer or a choke coil for a power supply.

2. Description of the Related Art

Dust cores using Fe metallic powder, Fe—Ni alloy powder, Fe—Al—Si alloy powder, or the like which are applied to electronic components and the like require a low core loss and excellent DC-superposed characteristics due to increases in frequency and current in recent years.

The dust cores are formed by solidifying soft magnetic alloy powder into a desired shape using a binding material and therefore have a lower core loss than that of a magnetic core according to the related art formed by winding or laminating a ribbon material and has a degree of freedom of the shape thereby obtaining better saturation magnetization than that of a ferrite core. Since the soft magnetic alloy powder which is the raw material of the dust core requires good soft magnetic characteristics such as high saturation magnetization and high magnetic permeability, application of Fe-based amorphous alloy powder (Japanese Unexamined Patent Application Publication No. 2004-156134), FeCuNbSiB-based nanocrystal alloy powder (Japanese Unexamined Patent Application Publication No. 64-28301), or the like has been considered. Accordingly, low core loss and good DC-superposed characteristics can be realized. Japanese Unexamined Patent Application Publication Nos. 02-180005, 01-68446, 2005-68451, 2007-270271, 2-232301, 57-185957, and 63-117406 are other examples of the above-described related arts.

SUMMARY OF THE INVENTION

However, due to an increase in the current of a power supply circuit in recent years, even higher DC-superposed characteristics are required while maintaining a low core loss. The Fe-based amorphous alloy powder as described in Japanese Unexamined Patent Application Publication No. 2004-156134 has a low core loss but still has low DC-superposed characteristics. The FeCuNbSiB-based nanocrystal alloy powder as described in Japanese Unexamined Patent Application Publication No. 64-28301 has to form homogeneous amorphous alloy powder first. However, this alloy base has insufficient amorphous forming ability, and since the cooling rate thereof is insufficient when a general water atomizing method or gas atomizing method is used as a method of forming a powder alloy, homogeneous and complete amorphous alloy powder cannot be made. Therefore, a homogenous bcc Fe($\alpha$-Fe) crystal phase cannot be obtained even though a crystallization heat treatment is performed thereafter, and a compound phase is precipitated. Therefore, there is a disadvantage that magnetic characteristics are significantly deteriorated when a dust core is formed of the powder.

The inventors studied intensively and developed an Fe-based soft magnetic alloy capable of obtaining a low core loss that is substantially the same as that according to the related art and better DC-superposed characteristics than that according to the related art.

The invention provides an Fe-based soft magnetic alloy capable of obtaining a low core loss and high DC-superposed characteristics, and a dust core using the Fe-based soft magnetic alloy.

According to an aspect of the invention, there is provided an Fe-based soft magnetic alloy including: Fe; and a component R, wherein the component R contains at least one of P, C, B, and Si, there is a temperature difference of equal to or greater than 20° C. between a precipitation temperature of an $\alpha$-Fe crystal phase and a precipitation temperature of an Fe compound, the Fe-based soft magnetic alloy is formed of a mixed-phase structure in which an amorphous phase and the $\alpha$-Fe crystal phase are mixed, and a diameter of a crystallite of the $\alpha$-Fe crystal phase is equal to or smaller than 50 nm, and a volume fraction of the $\alpha$-Fe crystal phase to the total is equal to or lower than 40%.

According to the aspect of the invention, it is preferable that a composition formula be represented by Fe100−x−uJxRu, a component J contains at least one of Cr, Co, Ni, and Nb, and 0 at %$\leq$x$\leq$6 at %, 17 at %$\leq$u$\leq$25 at %, and 17 at %$\leq$x+u$\leq$27.1 at % be satisfied.

In addition, according to the aspect of the invention, it is more preferable that the composition formula be represented by Fe100−x−y−z−w−tJxPyCzBwSit, and 0 at %$\leq$y$\leq$11 at %, 0 at %$\leq$z$\leq$4.2 at %, 5.7 at %$\leq$w$\leq$17 at %, 0 at %$\leq$t$\leq$11 at %, and 17 at %$\leq$x+y+z+w+t$\leq$27.1 at % be satisfied.

According to the aspect of the invention, the Fe-based soft magnetic alloy may include: Fe; a component M containing at least one of Cr, Co, and Ni excluding Nb from the component J; and P, C, B, and Si, the composition formula may be represented by Fe100−x−y−z−w−tMxPyCzBwSit, and x, y, z, w, and t representing composition ratios may satisfy 0 at %$\leq$x$\leq$6 at %, 0.3 at %$\leq$y$\leq$8.3 at %, 2.15 at %$\leq$z$\leq$4.2 at %, 5.7 at %$\leq$w$\leq$16.7 at %, 1.9 at %$\leq$t$\leq$8.9 at %, and 72.9 at %$\leq$100−x−y−z−w−t$\leq$79.4 at %. In the above description, it is more preferable that 2.3 at %$\leq$y$\leq$8.3 at %, 6.7 at %$\leq$w$\leq$11.7 at %, and 1.9 at %$\leq$t$\leq$5.9 at % be satisfied.

Alternatively, according to the aspect of the invention, it is preferable that the composition formula be represented by Fe100−w−t−bBwSitCrb, and 11 at %$\leq$w$\leq$17 at %, 0 at %$\leq$t$\leq$10 at %, 0 at %$\leq$b$\leq$1 at %, and 75 at %$\leq$100−w−t−b$\leq$83 at % be satisfied.

In addition, according to the aspect of the invention, the Fe-based soft magnetic alloy may include: Fe; a component L containing Nb included in the component J, or Nb and Cr; and P and B included in the component R, the composition formula thereof may be represented by Fe100−y−w−aPyBwLa, and 6 at %$\leq$y$\leq$11 at %, 8 at %$\leq$w$\leq$14 at %, 2 at %$\leq$a$\leq$3 at %, and 77 at %$\leq$100−y−w−a$\leq$80 at % may be satisfied.

In addition, a dust core according to the aspect of the invention is formed by solidifying powder of the Fe-based soft magnetic alloy according to any of above descriptions using a binding material.

According to the aspect of the invention, the Fe-based soft magnetic alloy that is obtained by an atomizing method, a liquid quenching method, or the like is subjected to a predetermined heating treatment to precipitate the $\alpha$-Fe crystal phase, thereby obtaining the mixed-phase structure in which the amorphous phase and the $\alpha$-Fe crystal phase are mixed. When an Fe-based soft magnetic alloy that deviates from the above composition is subjected to a heating treatment, an Fe compound is precipitated without precipitation of the α-Fe crystal phase, or the precipitation temperature of the α-Fe crystal phase and the precipitation temperature of the Fe compound become too close to each other, and the Fe compound is more likely to be precipitated as well as the α-Fe crystal phase. In the Fe-based soft magnetic alloy according to the aspect of the invention, temperature management can be properly performed during a heat treatment so that a temperature difference of equal to or greater than 20° between the precipitation temperature of α-Fe and the precipitation temperature of the Fe compound is provided.

In the Fe-based soft magnetic alloy according to the aspect of the invention having the mixed-phase structure formed in which the amorphous phase and the α-Fe crystal phase are mixed, higher saturation magnetization than that according to the related art and good magnetic permeability are obtained, so that substantially the same core loss as that according to the related art and higher DC-superposed characteristics than those according to the related art are obtained.

According to the aspect of the invention, the diameter of the crystallite of the α-Fe crystal phase included in the mixed-phase structure is controlled to be equal to or smaller than 50 nm, and the volume fraction of the α-Fe crystal phase to the total is controlled to be equal to or lower than 40%, so that the core loss can be reduced efficiently.

In addition, as the Fe-based soft magnetic alloy according to the aspect of the invention is applied to the dust core, increases in frequency, current, and the like can be properly coped with.

In the Fe-based soft magnetic alloy according to the aspect of the invention, higher saturation magnetization than that according to the related art and good magnetic permeability are obtained, so that substantially the same core loss as that according to the related art and higher DC-superposed characteristics than those according to the related art are obtained.

In addition, as the Fe-based soft magnetic alloy according to the aspect of the invention is applied to the dust core, increases in frequency, current, and the like can be properly coped with.

DESCRIPTION OF THE PREFERRED EMBODIMENTS

Figure 1:
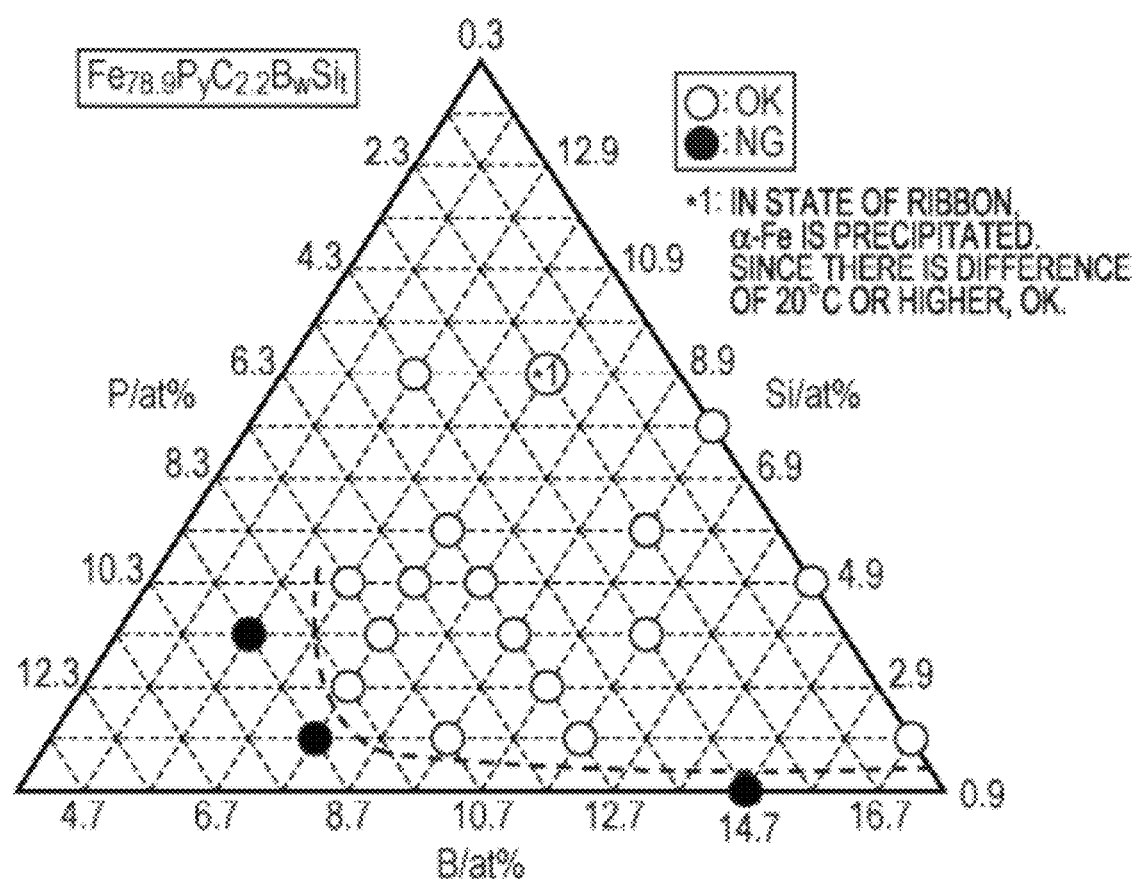
FIG. 1 is a ternary phase diagram of each sample of Nos. 1 to 34 in Table 1 of which the composition formulae are represented by Fe78.9PyC2.2BwSit.

In this embodiment, an Fe-based soft magnetic alloy has Fe (iron) and a component R. The component R contains at least one of P (phosphorus), C (carbon, B (boron), and Si (silicon).

In addition, in this embodiment, there is a temperature difference of equal to or greater than 20° C. between the precipitation temperature of an α-Fe crystal phase and the precipitation temperature of an Fe compound. Therefore, it was proved by experiments described later that a core loss is increased when an Fe compound as well as an α-Fe crystal phase are precipitated. The Fe compound is FeP or the like.

In this embodiment, a mixed-phase structure in which an amorphous phase and an α-Fe crystal phase are mixed can be formed by the Fe-based soft magnetic alloy. The diameter of a crystallite of the α-Fe crystal phase included in the mixed-phase structure is equal to or smaller than 50 nm, and the volume fraction of the α-Fe crystal phase to the total is equal to or lower than 40%. Accordingly, good soft magnetic characteristics such as higher saturation magnetization and higher magnetic permeability than those according to the related art are obtained, so that it is possible to obtain substantially the same core loss as that according to the related art and higher DC-superposed characteristics than those according to the related art.

The composition formula of the Fe-based soft magnetic alloy according to this embodiment is represented by Fe100−x−uJxRu, and the component J contains at least one of Cr (chromium), Co (cobalt), Ni (nickel), and Nb (niobium). It is preferable that 0 at %≦x≦6 at %, 17 at %≦u≦25 at %, and 17 at %≦x+u≦27.1 at %. In addition, in this embodiment, the composition formula is represented by Fe100−x−y−z−w−tJxPyCzBwSit. It is more preferable that 0 at %≦y≦11 at %, 0 at %≦z≦4.2 at %, 5.7 at %≦w≦17 at %, 0 at %≦t≦11 at %, and 17 at %≦x+y+z+w+t≦27.1 at %. Accordingly, the Fe-based soft magnetic alloy which has a temperature difference of equal to or greater than 20° C. between the precipitation temperature of the α-Fe crystal phase and the precipitation temperature of the Fe compound can be appropriately and easily formed.

Next, an Fe-based soft magnetic alloy according to a first embodiment will be described.

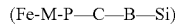

(Fe-M-P—C—B—Si)

At least P, C, B, and Si are contained while Fe is contained as a main component. The Fe-based soft magnetic alloy is represented by the composition formula as follows.

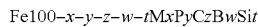

Fe100−x−y−z−w−tMxPyCzBwSit

Here, the component M contains at least one of Cr, Co, and Ni by excluding Nb from the component J. The x, y, z, w, and t representing composition ratios satisfy 0 at %≦x≦6 at %, 0.3 at %≦y≦8.3 at %, 2.15 at %≦z≦4.2 at %, 5.7 at %≦w≦16.7 at %, 1.9 at %≦t≦8.9 at %, and 72.9 at %≦100−x−y−z−w−t≦79.4 at %.

As described above, the Fe-based soft magnetic alloy of the first embodiment contains Fe exhibiting magnetic characteristics and metalloid elements such as P, C, B, and Si having an amorphous forming ability.

In addition, the Fe-based soft magnetic alloy of the first embodiment is formed of the mixed-phase structure in which the amorphous phase which is a main phase and the α-Fe crystal phase are mixed, by a heat treatment. The α-Fe crystal phase has a bcc structure. Moreover, according to experimental results that will be described later, an Fe-based soft magnetic alloy having a mixed-phase structure in which an amorphous phase and an α-Fe crystal phase (without precipitation of other crystal phases) while a heat treatment was not performed thereon was present. In this case, with regard to the temperature difference between the precipitation temperature of the α-Fe crystal phase and the precipitation temperature of the Fe compound, the precipitation temperature of the Fe compound is regarded as the temperature difference.

The Fe content (100−x−y−z−w−t) of the Fe-based soft magnetic alloy of the first embodiment is equal to or higher than 72.9 at % and equal to or lower than 79.4 at %. The Fe content is suitably equal to or higher than 77.4 at %. Since the Fe content is high as such, high saturation magnetization can be obtained. When the amount of Fe added is too high, a reduced vitrification temperature (Tg/Tm) representing the degree of the amorphous forming ability of an alloy is more likely to be less than 0.50, and the amorphous forming ability is degraded, which is not preferable. Moreover, Tm in the above formula represents a temperature at which an alloy is completely melted after the alloy is heated.

In addition, in the Fe-based soft magnetic alloy in the first embodiment, as described above, the content y of P added is equal to or higher than 0.3 at % and equal to or lower than 8.3 at %. The content y of P added is suitably equal to or higher than 2.3 at % and is more suitably equal to or higher than 5.3 at %. In addition, the content w of B added is equal to or higher than 5.7 at % and equal to or lower than 16.7 at %. The content w of B added is suitably in the range of equal to or higher than 6.7 at % and equal to or lower than 11.7 at %, and is more suitably equal to or lower than 10.7 at %. In addition, the content t of Si added suitably satisfies 1.9 at %≦t≦8.9 at % and is equal to or lower than 5.9 at %.

In such a composition, the temperature interval ΔTx of a supercooled liquid represented by the formula ΔTx=Tx−Tg (here, Tx represents a crystallization starting temperature, and Tg represents a glass transition temperature) is equal to or greater than 20 K, and ΔTx has a significant temperature interval of equal to or greater than 40 K depending on the composition, so that the amorphous forming ability can further be enhanced.

As the component M, at least one of Cr, Co, and Ni is selected. Among them, Cr can form a passivated oxide film on the alloy and thus enhances corrosion resistance of the Fe-based soft magnetic alloy. For example, generation of corroded parts that are generated when an alloy melt comes into contact with direct water during a water atomizing method, and furthermore, during a process of drying the Fe-based soft magnetic alloy can be prevented.

In addition, Co has an effect of increasing the Curie temperature Tc and simultaneously increasing the saturation magnetization. Similarly to Cr, Ni also enhances corrosion resistance.

The component M is not an essential component and may not be contained in the Fe-based soft magnetic alloy. If the component M is contained, the content thereof is adjusted to be equal to or lower than 6 at %.

When C is added to the Fe-based soft magnetic alloy, thermal stability is enhanced. In addition, addition of Si also contributes to thermal stability. The content z of C added is equal to or higher than 2.15 at % and equal to or lower than 4.2 at %. The content z of C added is suitably equal to or higher than 2.2 at %.

In this embodiment, the Fe-based soft magnetic alloy completed by the above composition formula may be produced by, for example, an atomizing method into a powder form or by a liquid quenching method into a band form (ribbon form). However, at this time point, the entire structure is in an amorphous state (in addition, as described above, precipitation of the α-Fe crystal phase as well as the amorphous phase are present in an athermal-treated state (as-Q)).

In this embodiment, a heating treatment is performed on the Fe-based soft magnetic alloy in the powder form or the Fe-based soft magnetic alloy in the band form obtained as described above to relax the internal stress that occurs during formation of the Fe-based soft magnetic alloy, thereby forming a state where structure relaxation in which extra Fe rather than a eutectic composition starts to be precipitated and progresses most, that is, the mixed-phase structure in which the amorphous phase and the α-Fe crystal phase are mixed.

The Fe-based soft magnetic alloy of the first embodiment is characterized by the composition formula described above and the mixed-phase structure in which the amorphous phase and the α-Fe crystal phase are mixed.

When the heating treatment is performed on an Fe-M-P—C—B—Si alloy of which the composition deviates from the above composition, an Fe compound is precipitated without precipitation of an α-Fe crystal phase or along with the α-Fe crystal phase, or the precipitation temperature of the α-Fe crystal phase and the precipitation temperature of the Fe compound become close to each other.

The Fe-based soft magnetic alloy of the first embodiment is properly subjected to temperature management for providing a temperature difference of equal to or greater than 20° C. between the precipitation temperature of α-Fe and the precipitation of the Fe compound. The temperature difference of equal to or greater than 20° C. is a numerical value obtained when the heating treatment is performed on the Fe-based soft magnetic alloy of the first embodiment at a rate of temperature increase of 40° C./min.

The Fe-based soft magnetic alloy of the first embodiment obtains good soft magnetic characteristics such as higher saturation magnetization and higher magnetic permeability than those according to the related art and even smaller coercivity, so that substantially the same core loss as that according to the related art and higher DC-superposed characteristics than those according to the related art are obtained.

(Fe—B—Si)

An Fe-based soft magnetic alloy of a second embodiment contains Fe as a main component and B, or B and Si. The Fe-based soft magnetic alloy is represented by the following composition formula.

The composition formula is represented by Fe100−w−t−bBwSitCrb and satisfies 11 at %≦w≦17 at %, 0 at %≦t≦10 at %, 0 at %≦b≦1 at %, and 75 at %≦100−w−t−b≦83 at %. In addition, the composition ratio of Si is preferably equal to or higher than 2 at %, and is preferably equal to or lower than 7 at %. In addition, the composition ratio of B is preferably equal to or higher than 12 at %.

The Fe-based soft magnetic alloy of the second embodiment is formed of a mixed-phase structure in which an amorphous phase as a main phase and an α-Fe crystal phase are mixed, by a heat treatment.

The Fe-based soft magnetic alloy of the second embodiment is also properly subjected to temperature management for providing a temperature difference of equal to or greater than 20° C. between the precipitation temperature of α-Fe and the precipitation of an Fe compound.

(Fe—P—B—L)

An FE-Based Soft Magnetic Alloy of a Third Embodiment Contains FE, Nb contained in the component J or an component L containing Nb or Cr, and P and B contained in the component R. The Fe-based soft magnetic alloy is represented by the following composition formula.

The composition formula is represented by Fe100−y−w−aPyBwLa and satisfies 6 at %≦y≦11 at %, 8 at %≦w≦14 at %, 2 at %≦a≦3 at %, and 77 at %≦100−y−w−a≦80 at %. The composition ratio of Fe is preferably equal to or lower than 79 at %.

The Fe-based soft magnetic alloy of the third embodiment is formed of a mixed-phase structure in which an amorphous phase and an α-Fe crystal phase are mixed.

In addition, the Fe-based soft magnetic alloy of the third embodiment is also properly subjected to temperature management for providing a temperature difference of equal to or greater than 20° C. between the precipitation temperature of α-Fe and the precipitation of an Fe compound.

Otherwise, as an Fe-based soft magnetic alloy other than the above, which has a temperature difference of equal to or greater than 20° C. between the precipitation temperature of α-Fe and the precipitation of an Fe compound, Fe—Cr—Si—B—C may be proposed.

In this embodiment, the diameter of a crystallite of the α-Fe crystal phase included in the mixed-phase structure is equal to or smaller than 50 nm, and the volume fraction of the α-Fe crystal phase to the total is equal to or lower than 40%. More preferably, the volume fraction thereof is equal to or lower than 10%. Here, the diameter of the crystallite of the α-Fe crystal phase and the volume fraction of the precipitation amount can be obtained by an X-ray diffraction method. In this embodiment, measurement of X-ray patterns was performed under the following conditions. The diameter of the crystallite was obtained from the half-width of the α-Fe peak using the Scherrer equation, and the volume fraction of the precipitation amount was obtained by ratios of intensity of crystal parts of α-Fe and amorphous parts. The crystal phase of α-Fe is a structure in which the above-mentioned crystallite is singly present or a plurality of crystallites is aggregated.

X-Ray Measurement Conditions
Scan method: step-scan Bulb: Co
Scan width: 0.004°
Counting time: 1 second From the above measurement conditions, it was found that the core loss can be efficiently reduced when the diameter of the crystallite of the α-Fe crystal phase is equal to or smaller than 50 nm and the volume fraction of the α-Fe crystal phase of the total is equal to or smaller than 40%.

Fe-based soft magnetic alloy powder in this embodiment is used for, for example, a dust core which is formed by solidification using a binding material. The Fe-based soft magnetic alloy powder is formed into a substantially spherical shape or elliptical shape. A large amount of the Fe-based soft magnetic alloy powder is present in the dust core and the Fe-based soft magnetic alloy powder is insulated by the binding material.

As the binding material, a resin or rubber in a liquid form or a powder form such as epoxy resin, silicone resin, silicone rubber, phenol resin, urea resin, melamine resin, or PVA (polyvinyl alcohol), water glass (Na2O—SiO2), oxide glass powder (Na2O—B2O3-SiO2, PbO—B2O3-SiO2, PbO—BaO—SiO2, Na2O—B2O3-ZnO, CaO—BaO—SiO2, Al2O3-B2O3-SiO2, or B2O3-SiO2), a glass-form material (one containing SiO2, Al2O3, ZrO2, TiO2, or the like as a main component) generated by a sol-gel method, or the like may be employed.

By using the Fe-based soft magnetic alloy of this embodiment for the dust core, increases in frequency, current, and the like can be properly coped with.

In addition, the application of the Fe-based soft magnetic alloy of this embodiment is not limited to the dust core.

In order to produce the above-mentioned dust core, first, Fe-based soft magnetic alloy powder is formed by an atomizing method. As the atomizing method, a water atomizing method or a gas atomizing method is suitably used.

Subsequently, the Fe-based soft magnetic alloy powder, and an additive material including the binding material and a lubricating material are mixed with each other. Here, the mixing ratio of the binding material in the mixture is suitably in the range of 0.3 mass % to 5 mass %. In addition, the mixing ratio of the lubricating material in the mixture is suitably in the range of 0.1 mass % to 2 mass %. As the lubricating material, for example, zinc stearate may be used.

After mixing the Fe-based soft magnetic alloy powder with the additive material, the resultant is dried and ground to obtain granulated powder.

The granulated powder is sifted so as to be easily charged into a mold for press forming For example, a sifter having an opening of equal to or greater than 300 μm and equal to or smaller than 850 μm is used, and granulated powder of 300 to 850 μm which is obtained by sifting is used.

Subsequently, compression molding is performed by charging the granulated powder into the mold and heating the powder to room temperature or a predetermined temperature while pressure is applied thereon, thereby obtaining a core precursor having a predetermined shape. For example, the press pressure is 20 t/cm2. In addition, the core precursor has, for example, a substantially ring shape.

Subsequently, the core precursor is subjected to a heat treatment. As for an example of the heat treatment condition, under an N2 gas atmosphere, heating is performed to 460° C. for 1 hour at a rate of temperature increase of 40° C./min Accordingly, an internal stress that is generated in the Fe-based soft magnetic alloy powder by the compression molding can be removed. Furthermore, in this embodiment, the α-Fe crystal phase can be precipitated in the structure of the Fe-based soft magnetic alloy powder formed to be amorphous.

Here, when the heating treatment temperature is set to be too high, an Fe compound is precipitated as well as the α-Fe crystal phase, and thus the core loss is increased, which is not preferable.

The Fe-based soft magnetic alloy of this embodiment can provide a temperature difference of equal to or greater than 20° C. between the precipitation temperature of the α-Fe crystal phase and the precipitation of the Fe compound when the heating treatment is performed at a rate of temperature increase of 40° C./min Therefore, according to this embodiment, temperature management so as not to precipitate an Fe compound during the heat treatment can be easily performed.

In addition, even though the Fe compound is not precipitated, when the precipitation amount of the α-Fe crystal phase is increased, the core loss is likely to be increased. Since the precipitation amount of the α-Fe crystal phase is increased when the heating treatment temperature is increased, it is preferable that the heating treatment temperature be adjusted so as to cause the content of the α-Fe crystal phase included in the mixed-phase structure having the amorphous phase mixed to be equal to or lower than 40%.

EXAMPLES

Experiment on Composition Range

A large number of Fe-based soft magnetic alloys shown in Table 1 (in Appendix) were formed. The alloys were all formed into ribbon shapes by a liquid quenching method.

In Table 1, Tc, Tg, Tx, ΔTx, Tm, Tg/Tm, Tx/Tm, and saturation magnetization σs of each sample are described.

Moreover, in precipitation temperature fields shown in Table 1, the precipitation temperatures of α-Fe crystal phases and the precipitation temperatures of Fe compounds are described. In addition, the mark "O" represents that an α-Fe crystal phase is precipitated when a heating treatment is performed at a rate of temperature increase of 40° C./min, and there is a temperature difference of equal to or greater than 20° C. between the precipitation temperature of the α-Fe crystal phase and the precipitation temperature of the Fe compound. For each sample, a heat treatment temperature was gradually increased, and temperatures at which the α-Fe crystal phase and the Fe compound were each precipitated were obtained by performing XRD analysis.

As shown in Table 1, in alloys of Nos. 9, 28, 39, 46, 52, and 53, Fe compounds were precipitated while α-Fe crystal phases were not precipitated, so that excellent magnetic characteristics were not expected to be obtained. In alloys of Nos. 11, 23, 27, 29, 37, 57, and 58, there was a temperature difference of about only 10° C. between the precipitation temperature of the α-Fe crystal phase and the precipitation temperature of the Fe compound, so that it was difficult to perform temperature control of the heating treatment for precipitating only the α-Fe crystal phase, and a compound phase was more likely to be precipitated. An alloy of No. 45 was produced into a band form (ribbon form) by a liquid quenching method. However, at this point, an Fe compound was precipitated in the entire structure. Therefore, it was assumed that there was no temperature difference between the precipitation temperature of the α-Fe crystal phase and the precipitation temperature of the Fe compound.

From the experimental results shown in Table 1, the compositions of the Fe-based soft magnetic alloys in these examples were defined as follows.

First, components were classified into Fe, an component R containing at least one of P, C, B, and Si, and a component J containing at least one of Cr, Co, Ni, and Nb.

In addition, the composition formula was set to Fe100−x−uJxRu. Here, there were samples without the component J contained, and when the component J was contained, the content thereof was 6 at % at the maximum. Therefore, 0 at %≦x≦6 at % was set. Subsequently, the content of the component R in each sample was 17 at % at the minimum and 25 at % at the maximum. Therefore, 17 at %≦u≦25 at % was set. Here, since 72.9 at % of Fe is needed at the minimum (an alloy of No. 34), the composition ratio x+u excluding Fe was 27.1 at % at the maximum. Therefore, 17 at %≦x+u≦27.1 at % was defined.

In addition, it is preferable that elements constituting the component R are represented by the formula Fe100−x−y−z−w−tJxPyCzBwSit. In the composition formula, from the experimental results of Table 1, it was defined that 0 at %≦y≦11 at %, 0 at %≦z≦4.2 at %, 5.7 at %≦w≦17 at %, 0 at %≦t≦11 at %, and 17 at %≦x+y+z+w+t≦27.1 at %.

Furthermore, alloys of examples Nos. 1 to 34 shown in Table 1 can be represented by the following composition formula.

That is, the composition formula is represented by Fe100−x−y−z−w−tMxPyCzBwSit. Here, the component M contains at least one of Cr, Co, and Ni excluding Nb from the component J. In addition, x, y, z, w, and t representing the composition ratios are set to 0 at %≦x≦6 at %, 0.3 at %≦y≦8.3 at %, 2.15 at %≦z≦4.2 at %, 5.7 at %≦w≦16.7 at %, 1.9 at %≦t≦89 at %, and 72.9 at %≦100−x−y−z−w−t≦79.4 at %.

Moreover, the composition ratio (100−x−y−z−w−t) of Fe is preferably equal to or higher than 77.4 at %. In addition, the composition ratio y of P is preferably equal to or higher than 2.3 at %, and more preferably, equal to or higher than 5.3 at %. In addition, the composition ratio z of C is preferably equal to or higher than 2.2 at %. In addition, the composition ratio w of B is preferably in the range of 6.7 at % to 11.7 at %, and more preferably, equal to or lower than 10.7 at %. In addition, the composition ratio t of Si is preferably equal to or lower than 5.9 at %.

FIG. 1 shows a ternary phase diagram of each sample of Nos. 1 to 34 of which the composition formulae are represented by Fe78.9PyC2.2BwSit.

In addition, as shown in Table 1 and FIG. 1, in the alloy of Fe78.9P2.3C2.2B7.7Si8.9 (No. 21), an α-Fe crystal phase was already precipitated (an Fe compound phase was not precipitated) outside an amorphous phase in an athermal-treated state (as-Q), and therefore the temperature difference between the precipitation temperature of the α-Fe crystal phase and the precipitation temperature of the Fe compound in the alloy was equal to or greater than 20° C., so that the alloy was used as an example.

Furthermore, alloys of Examples Nos. 35 to 48 can be represented by the following composition formula.

That is, the composition formula is represented by Fe100−w−t−bBwSitCrb. In addition, 11 at %≦w≦17 at %, 0 at %≦t≦10 at %, 0 at %≦b≦1 at %, and 75 at %≦100−w−t−

$b \leq 83$ at % are satisfied. Preferably, the composition ratio w of B is equal to or higher than 12 at %, and the composition ratio t of Si is equal to or lower than 7 at %.

Figure 2:
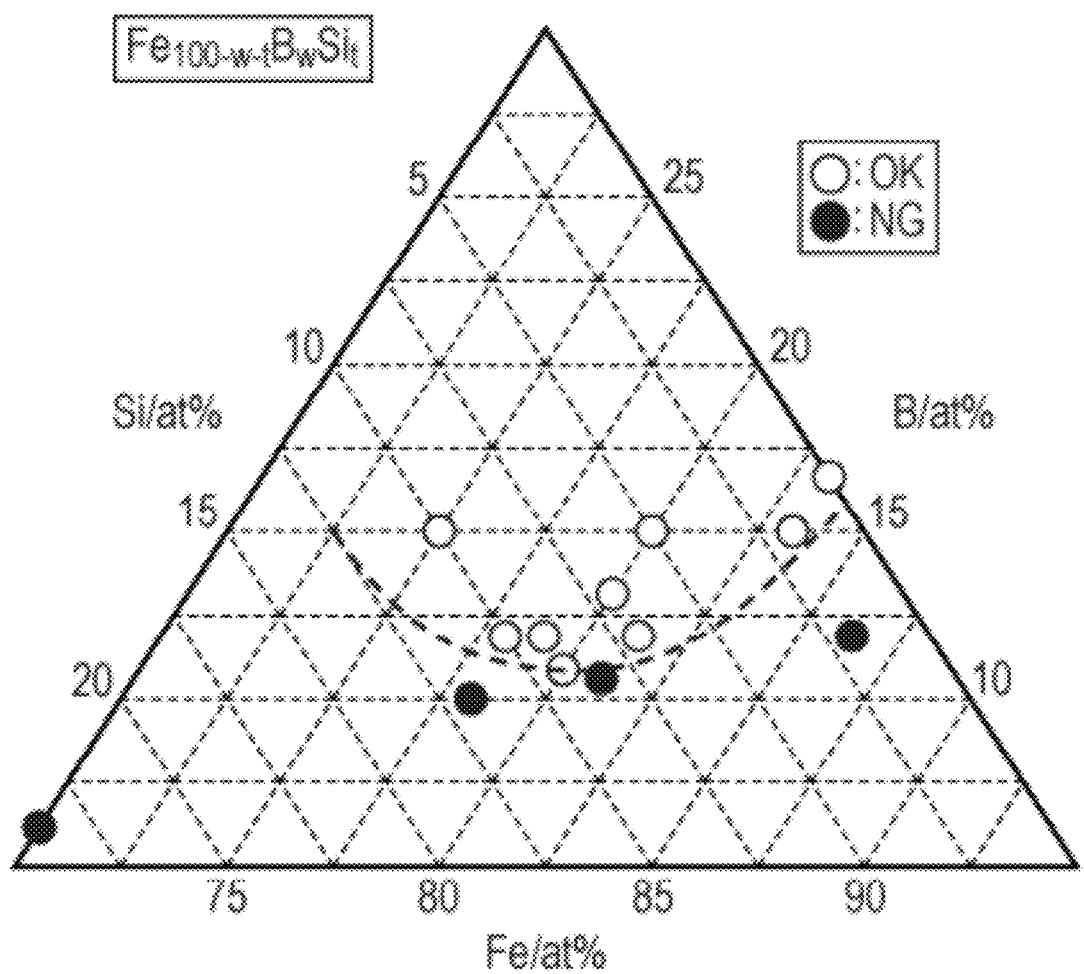
FIG. 2 is a ternary phase diagram of each sample of Nos. 35 to 47 in Table 1.

FIG. 2 shows a ternary phase diagram of each sample of Nos. 35 to 47.

Furthermore, alloys of Examples Nos. 49 to 56 can be represented by the following composition formula.

The composition formula is represented by Fe100−y−w−aPyBwLa. Here, the component L contains Nb included in the component J or Nb and Cr. In addition, 6 at %$\leq y \leq$11 at %, 8 at %$\leq w \leq$14 at %, 2 at %$\leq a \leq$3 at %, and 77 at %$\leq$100−y−w−a$\leq$80 at % are satisfied. Preferably, the composition ratio of Fe is equal to or lower than 79 at %.

Figure 3:
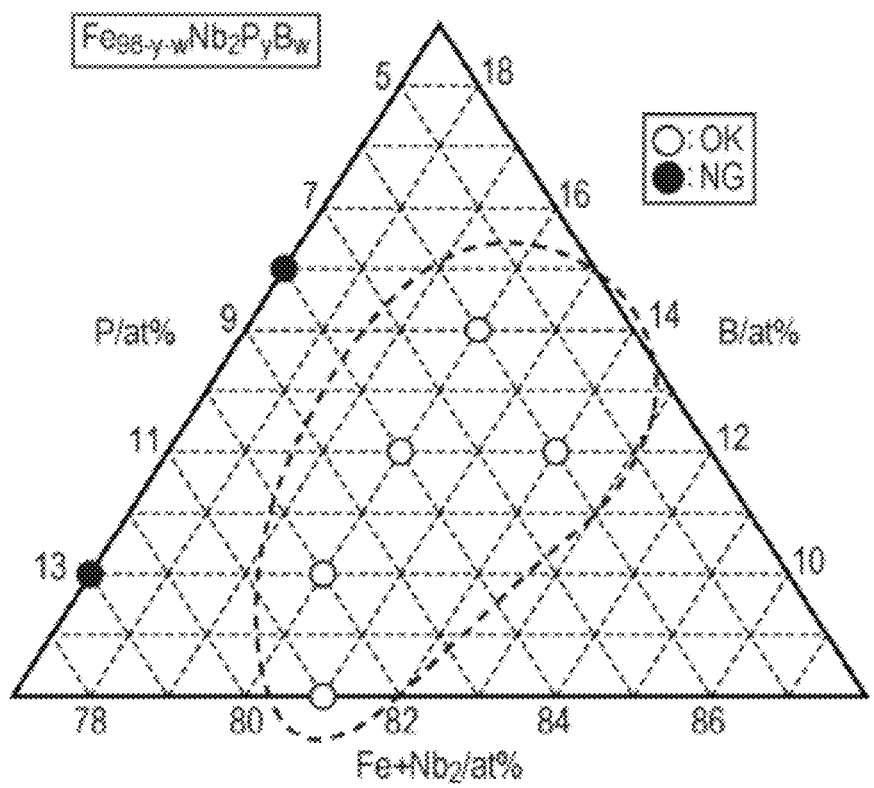
FIG. 3 is a ternary phase diagram of each sample of Nos. 49 to 55 in Table 1 of which the composition formulae are represented by Fe98−y−wPyBwNb2.

FIG. 3 is a ternary phase diagram of each sample of Nos. 49 to 55 of which the composition formulae are represented by Fe98−y−wPyBwNb2.

As shown in Table 1, in an alloy of Fe73.72Cr2.28Si11B11C2 (an alloy of No. 59), a temperature difference between the precipitation temperature of an α-Fe crystal phase and the precipitation temperature of an Fe compound was also equal to or greater than 20° C.

Experiments on Core Loss and DC-superposed Characteristics

Next, three types of Fe-based soft magnetic alloys shown in Table 2 as follows were formed into ribbon forms by a liquid quenching method. In addition, three types of Fe-based soft magnetic alloys shown in Table 3 were formed into powder forms by a water atomizing method.

TABLE 2

<Alloy characteristics>

| Alloy | Composition | Structure | Tc (K) | Tg (K) | Tx (K) | ΔTx (K) | Tm (K) | Tg/Tm | Tx/Tm | σs (×10⁻⁶ Wbm/kg) |
|---|---|---|---|---|---|---|---|---|---|---|
| A | $Fe_{74.43}Cr_{1.95}P_{9.04}C_{2.16}B_{7.54}Si_{4.87}$ | Amorphous | 597 | 784 | 834 | 50 | 1294 | 0.61 | 0.64 | 180/(1.29 T) |
| B | $Fe_{76.9}P_{7.3}C_{2.2}B_{7.7}Si_{3.9}$ | Amorphous | 643 | 749 | 791 | 42 | 1331 | 0.563 | 0.594 | 215/(1.57 T) |
| C | $Fe_{77.9}Cr_{1}P_{7.3}C_{2.2}B_{7.7}Si_{3.9}$ | Amorphous | 614 | 746 | 788 | 42 | 1338 | 0.558 | 0.589 | 202/(1.46 T) |

TABLE 3

<Powder Characteristics>

| Powder | Composition | Structure | $D_{10}$ (μm) | $D_{50}$ (μm) | $D_{90}$ (μm) | TD (Mg/m³) | SA (m²/g) | σs (×10⁻⁶ Wbm/kg) |
|---|---|---|---|---|---|---|---|---|
| A | $Fe_{74.43}Cr_{1.96}P_{9.04}C_{2.16}B_{7.54}Si_{4.87}$ | Amorphous | 4.24 | 9.57 | 20.90 | 4.12 | 0.18 | 169/(1.2 T) |
| B | $Fe_{78.9}P_{7.3}C_{2.2}B_{7.7}Si_{3.9}$ | Amorphous | 4.37 | 10.11 | 21.06 | 4.29 | 0.27 | 199/(1.45 T)← |
| C | $Fe_{77.9}Cr_{1}P_{7.3}C_{2.2}B_{7.7}Si_{3.9}$ | Amorphous | 4.26 | 9.79 | 20.36 | 4.15 | 0.2 | 191/(1.4 T)← |

Moreover, the Fe-based soft magnetic alloys in the ribbon forms shown in Table 2 and the Fe-based soft magnetic alloys in the powder forms shown in Table 3 were not subjected to the heating treatment.

Subsequently, dust cores were formed using the three types of Fe-based soft magnetic alloy powders shown in Table 3.

The Fe-based soft magnetic alloy powder shown in Table 3, silicone resin (1.4 mass %), and zinc stearate (0.3 mass %) were mixed, dried, and ground, the resultant was sifted to 300 to 850 μm using a sifter having an opening of 300 μm and an opening of 850 μm so as to form granulated powder, the granulated powder was formed into a core precursor having a ring form with an outside diameter of 20 mm, an inside diameter of 12 mm, and a height of 6.8 mm under a press pressure 20 t/cm2, and the core precursor was heated to each heating process temperature shown in Table 4 as follows at a rate of temperature increase of 40° C./min under an N2 gas atmosphere for 1 hour, thereby obtaining the dust core.

In addition, core loss, magnetic permeability, DC-superposed characteristics (μ5500 A/m) of each dust core shown in Table 4 were measured.

TABLE 4

<Dust Core Characteristics>

| Core | Composition | Core loss (kW/m³)(100 kHz, 100 mT) | Magnetic permeability μ(100 kHz) | DC-superposed characteristics μ(5500 A/m)(100 kHz) | Heat treatment temperature (° C.) |
|---|---|---|---|---|---|
| A | $Fe_{74.43}Cr_{1.96}P_{9.04}C_{2.16}B_{7.54}Si_{4.87}$ | 276 | 58.1 | 31.6 | 490 |
| B | $Fe_{78.9}P_{7.3}C_{2.2}B_{7.7}Si_{3.9}$ | 290← | 59.1 | 38.3← | 460 |
| C | $Fe_{77.9}Cr_{1}P_{7.3}C_{2.2}B_{7.7}Si_{3.9}$ | 302← | 63.4 | 37.1← | 460 |

Fe-based soft magnetic alloys B and C are all included in the composition range of this example. On the other hand, an Fe-based soft magnetic alloy A deviates from the composition range of this example. As shown in Tables 2 to 4, the Fe contents of the Fe-based soft magnetic alloys B and C are not greater than the Fe content of the Fe-based soft magnetic alloy A.

As shown in Tables 2 and 3, the saturation magnetizations σs of the Fe-based soft magnetic alloys B and C became greater than that of the saturation magnetization σs of the Fe-based soft magnetic alloy A. In addition, as shown in Table 4, it was found that dust cores B and C formed using the Fe-based soft magnetic alloy powders B and C shown in Table 3 could be made to have a low core loss that was substantially the same as the core loss of a dust core A formed using the Fe-based soft magnetic alloy powder A (about 300 kW/m3), and had higher DC-superposed characteristics than those of the dust core A.

Experiment on Dust Core A

Figure 4:
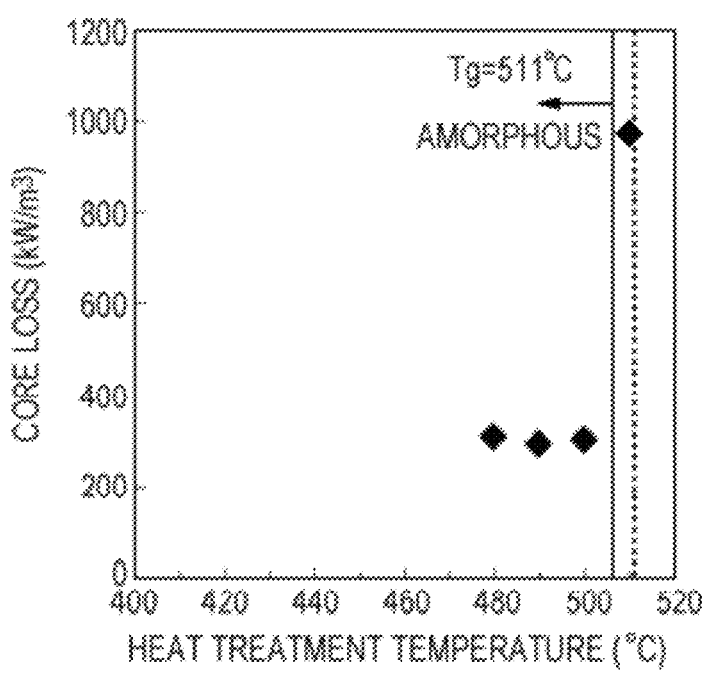
FIG. 4 is a graph showing a relationship between heating treatment temperature for a dust core A (Comparative Example) shown in Table 4 and core loss.

Next, a heating treatment to another temperature was performed on the dust core A (Comparative Example) shown in Table 4, and the relationship between the heating treatment temperature and the core loss was measured. The experimental results are shown in FIG. 4. As for the heating treatment conditions, the dust core A was heated to the heating treatment temperature at a rate of temperature increase of 40° C./min under an N2 gas atmosphere, and when the temperature reached the heating treatment temperature, heated for 1 hour.

As shown in FIG. 4, it was found that the core loss was low at a heating treatment temperature of up to about 500° C. However, at a temperature of higher than 500° C., the core loss was rapidly increased. From this point of view, it was concluded that temperature management of the dust core A in Comparative Example was difficult, and even though the dust core A was subjected to a heating treatment at an optimal heating temperature, when the temperature was partially higher than 500° C., the characteristics thereof were significantly deteriorated, resulting in an unstable quality in mass production.

Figure 5:
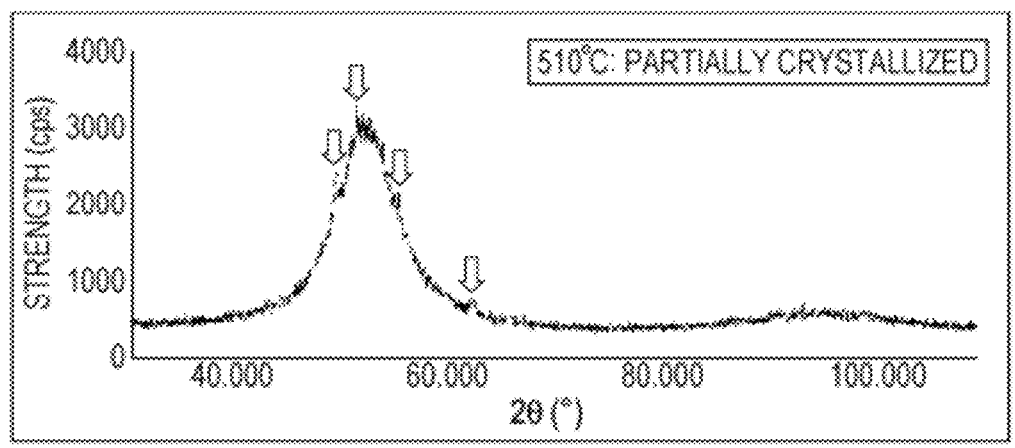
FIG. 5 shows XRD measurement results obtained when a heating treatment is performed on the dust core A to 510° C.

FIG. 5 shows XRD measurement results obtained when a heating treatment was performed on the dust core A to 510° C. As shown in FIG. 5, it was found that besides a broad diffraction peak representing amorphous, crystallization peaks (indicated by arrows) were shown at different diffraction angles. This shows that the composition of the Fe-based soft magnetic alloy of the dust core A could not obtain the characteristics of this embodiment in which only an α-Fe crystal phase was precipitated.

Figure 6:
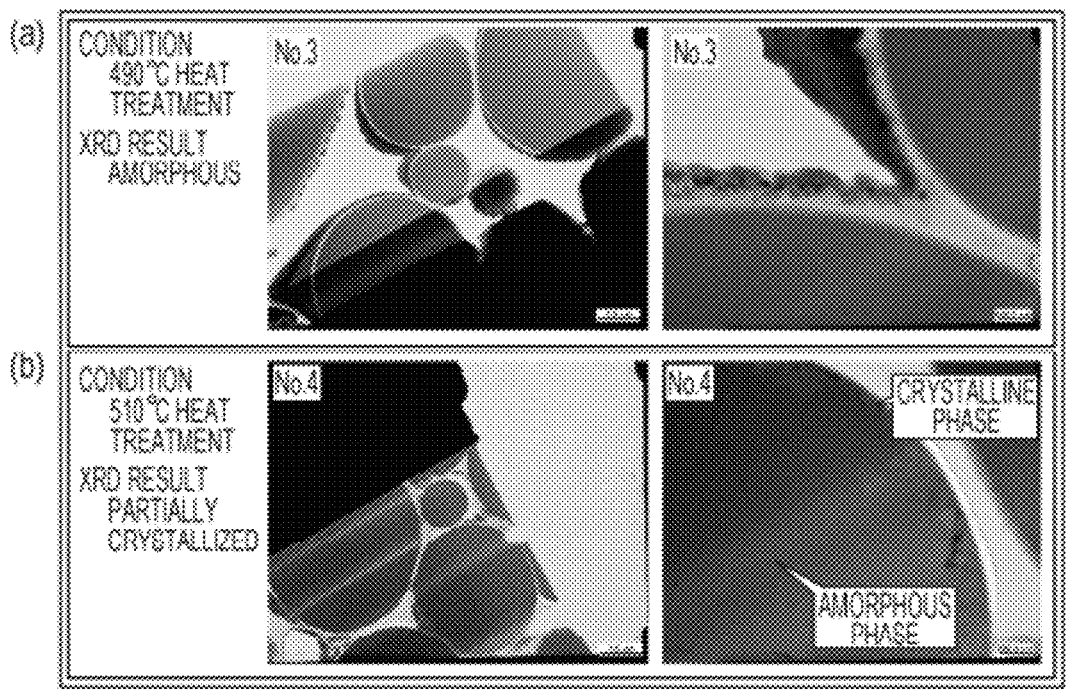
FIG. 6A shows TEM photographs of the dust core A when a heating treatment to 490° C. is performed.
FIG. 6B shows TEM photographs of the dust core A when a heating treatment to 510° C. is performed.

FIG. 6A shows TEM photographs of the dust core A when a heating treatment to 490° C. is performed, and FIG. 6B shows TEM photographs of the dust core A when a heating treatment to 510° C. is performed.

In FIG. 6A and FIG. 6B, parts shown as black and circular represent the Fe-based soft magnetic alloy powder. As shown in FIG. 6A, it was found that during heating to 490° C., the entire structure of the Fe-based soft magnetic alloy powder was amorphous. On the other hand, as shown in FIG. 6B, it was found that during heating to 510° C., a crystal phase besides an amorphous phase was precipitated.

In consideration of the crystal phase, as seen from the XRD measurement in FIG. 5, it was found that an Fe compound was contained in addition to the α-Fe crystal phase.

As shown in FIG. 4, when the heating treatment temperature for the dust core A was increased, a crystal phase was precipitated in the Fe-based soft magnetic alloy powder in the vicinity of 505° C. as a line of demarcation. As shown in FIG. 4, it was found that even though the heating treatment was performed, when the entire structure was in an amorphous state, the core loss was low. However, if the crystal phase was precipitated, in addition to the α-Fe crystal phase, other Fe compounds that might have an adverse effect on magnetic characteristics were simultaneously precipitated, and the core loss was significantly increased.

Experiment on Dust Core B

Figure 7:
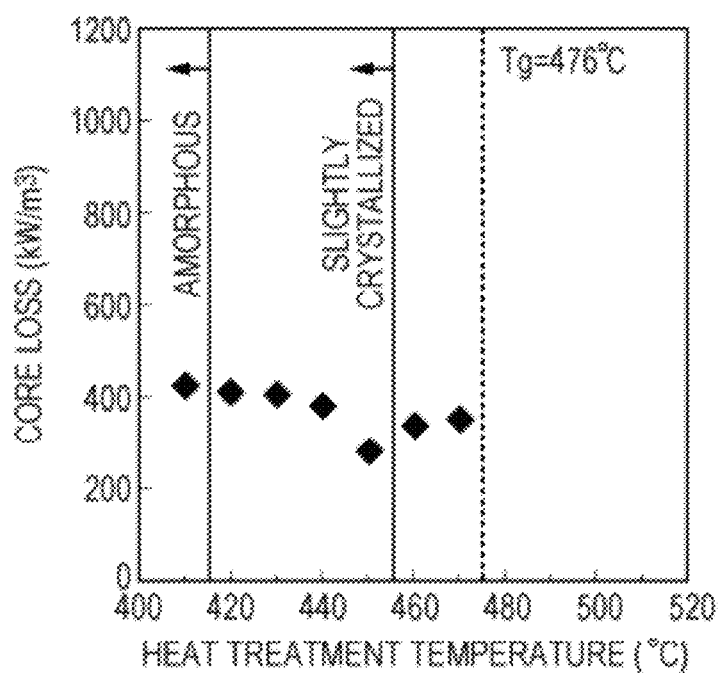
FIG. 7 is a graph showing a relationship between heating treatment temperature for a dust core B (Example) shown in Table 4 and core loss.

Next, a heating treatment at another temperature was performed on the dust core B (Example) shown in Table 4, and the relationship between the heating treatment temperature and the core loss was measured. The experimental results are shown in FIG. 7. As for the heating treatment conditions, the dust core B was heated to the heating treatment temperature at a rate of temperature increase of 40° C./min under an N2 gas atmosphere, and when the temperature reached the heating treatment temperature, heated for 1 hour.

Figure 8:
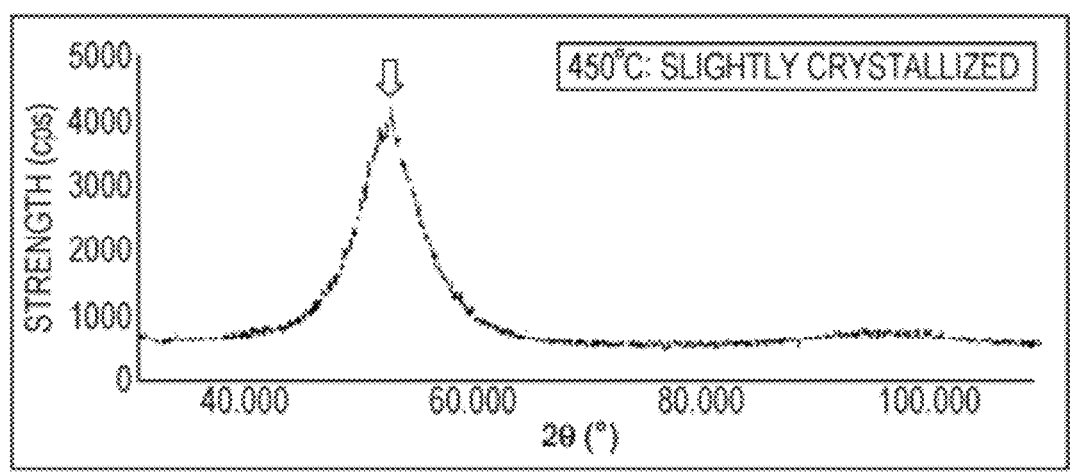
FIG. 8 shows XRD measurement results obtained when a heating treatment is performed on the dust core B to 450° C.

FIG. 8 shows XRD measurement results obtained when a heating treatment was performed on the dust core A to 450° C. As shown in FIG. 8, it was found that besides a broad diffraction peak representing amorphous, an α-Fe crystal phase was shown.

Figure 9:
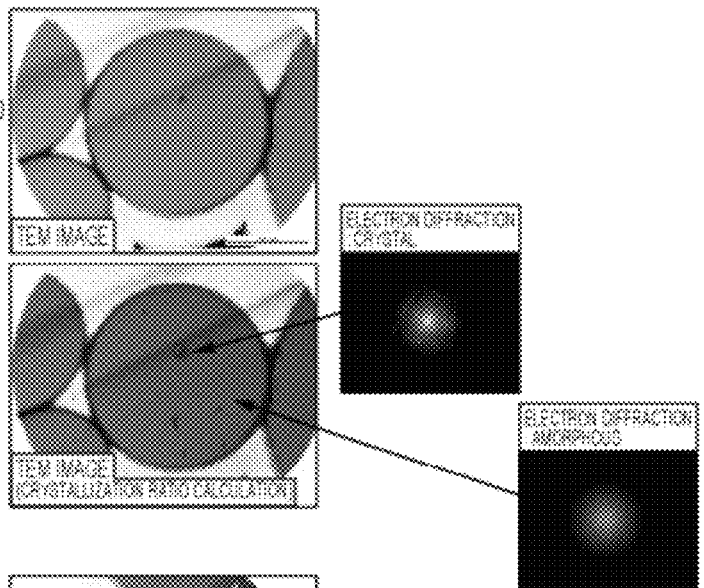
FIG. 9A shows TEM photographs and electron diffraction patterns of the dust core B when a heating treatment to 450° C. is performed.
FIG. 9B shows TEM photographs and electron diffraction patterns of the dust core B when a heating treatment to 470° C. is performed.

FIG. 9A shows TEM photographs of the dust core B when a heating treatment to 450° C. is performed, and FIG. 9B shows TEM photographs of the dust core B when a heating treatment to 470° C. is performed. In FIGS. 9A and 9B, electron diffraction patterns are further included. In addition, FIG. 10 shows TEM photographs further enlarging FIG. 9A.

Figure 10:
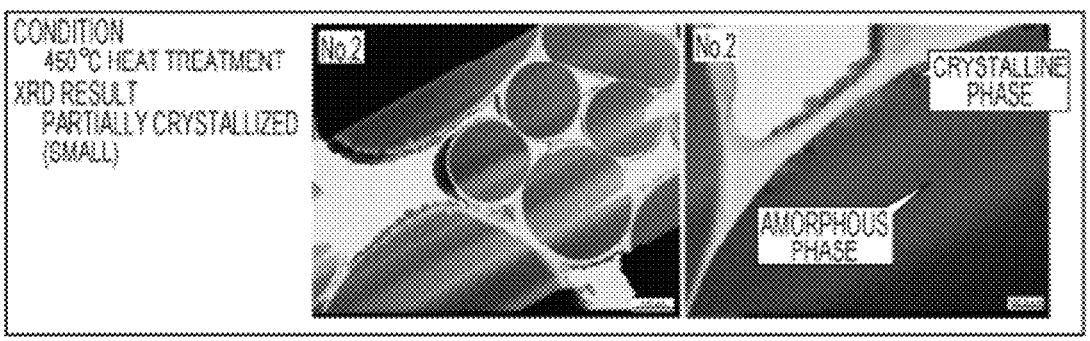
FIG. 10 shows TEM photographs further enlarging FIG. 9A.

As shown in FIGS. 8, 9A, and 10, it was found that during heating to 450° C., Fe-based soft magnetic alloy powder had a mixed-phase structure in which an amorphous phase and an α-Fe crystal phase were mixed. In addition, the precipitation amount of the α-Fe crystal phase was 10 to 20% to the structure of the Fe-based soft magnetic alloy powder. Moreover, the diameter (average) of a crystallite of the α-Fe crystal phase shown in FIG. 9A was about 35 to 45 nm. It was thought that most of the crystal phase was the α-Fe crystal phase as shown in the electron diffraction pattern shown in FIG. 9A.

However, even though the crystal phase was precipitated up to about 20%, an increase in the core loss could be suppressed as shown in FIG. 7.

On the other hand, as shown in FIG. 9B, during heating to 470° C., the precipitation amount of the crystal phase was increased up to about 20%. It was thought that most of the crystal phase was the α-Fe crystal phase as shown in the electron diffraction pattern shown in FIG. 9B. However, even though the precipitation amount of the crystal phase was increased up to about 20%, as shown in FIG. 7, it was found that the core loss was not much increased. Moreover, the diameter (average) of the crystallite of the crystal phase shown in FIG. 9B was about 40 to 45 nm.

In addition, as shown in FIG. 7, it was found that the core loss became smallest in a mixed-phase structure in which an α-Fe crystal phase was slightly precipitated in the amorphous phase of the Fe-based soft magnetic alloy.

Experiment on Dust Core C

Figure 11:
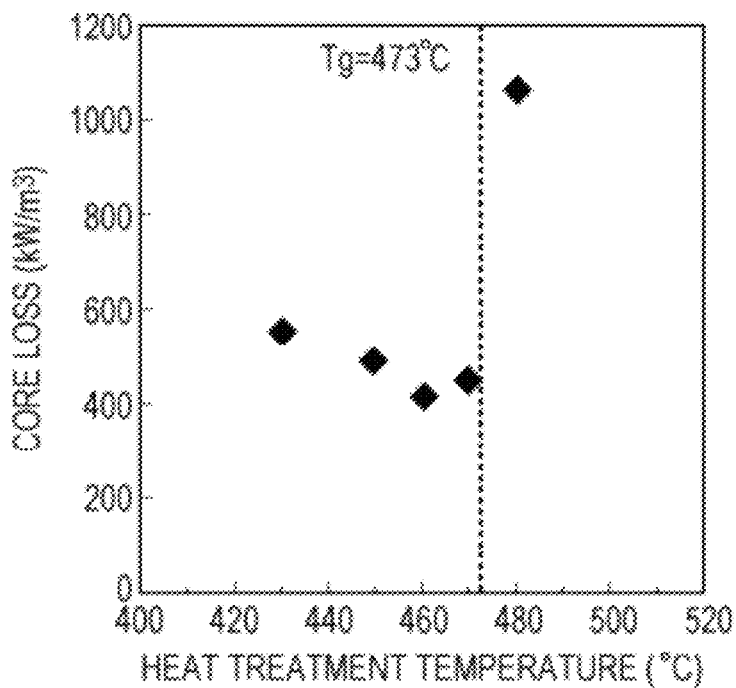
FIG. 11 is a graph showing a relationship between heating treatment temperature for a dust core C (Example) shown in Table 4 and core loss.

Next, a heating treatment at another temperature was performed on the dust core C (Example) shown in Table 4, and the relationship between the heating treatment temperature and the core loss was measured. The experimental results are shown in FIG. 11. As for the heating treatment conditions, the dust core C was heated to the heating treatment temperature at a rate of temperature increase of 40° C./min under an N2 gas atmosphere, and when the temperature reached the heating treatment temperature, heated for 1 hour.

Figure 12:
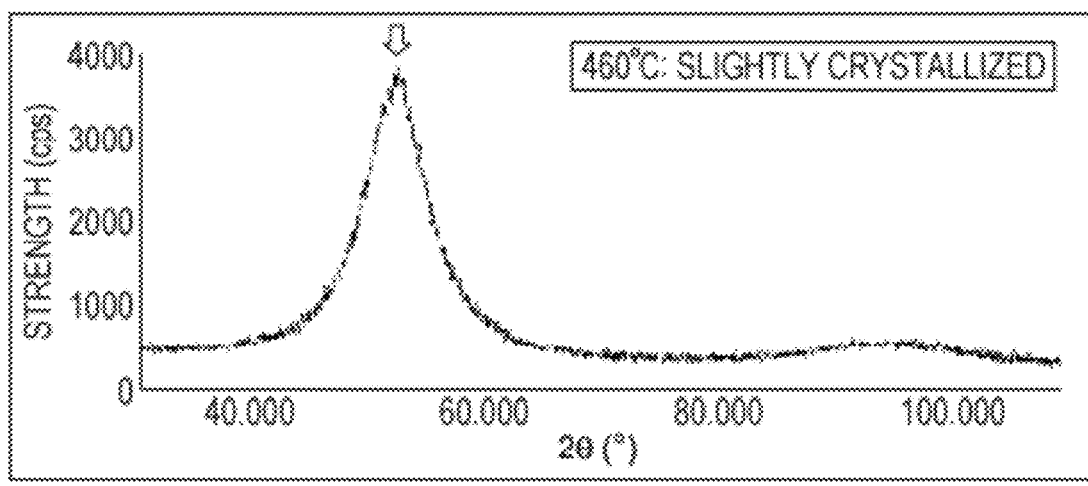
FIG. 12 shows XRD measurement results obtained when a heating treatment is performed on the dust core C to 460° C.

FIG. 12 shows XRD measurement results obtained when a heating treatment is performed on the dust core C to 460° C. As shown in FIG. 12, it was found that besides a broad diffraction peak representing amorphous, an α-Fe crystal phase was shown.

Figure 13:
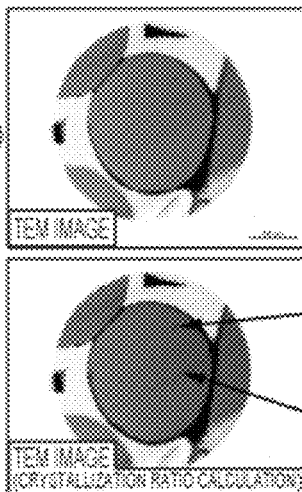
FIG. 13A shows TEM photographs and electron diffraction patterns of the dust core C when a heating treatment to 460° C. is performed.
FIG. 13B shows TEM photographs of the dust core C when a heating treatment to 480° C. is performed.
Figure 13:
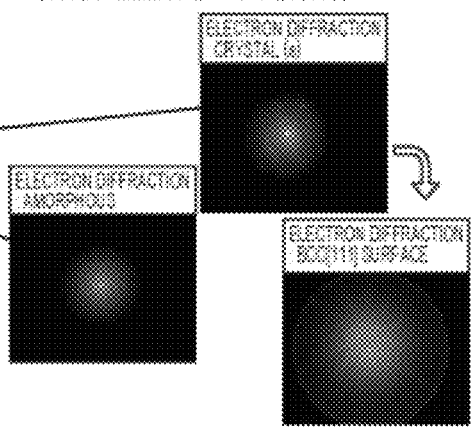
Figure 13:
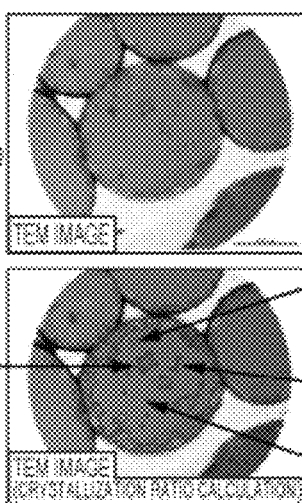
Figure 13:
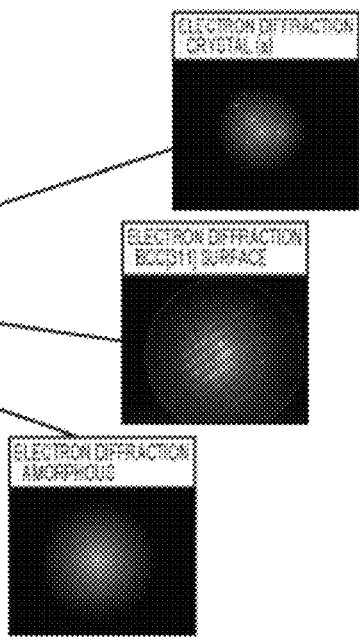

FIG. 13A shows TEM photographs of the dust core C when a heating treatment to 460° C. is performed, and FIG. 13B shows TEM photographs of the dust core C when a heating treatment to 480° C. is performed. In FIGS. 13A and 13B, electron diffraction patterns are further included. In addition, FIG. 14 shows TEM photographs further enlarging FIG. 13A.

Figure 14:
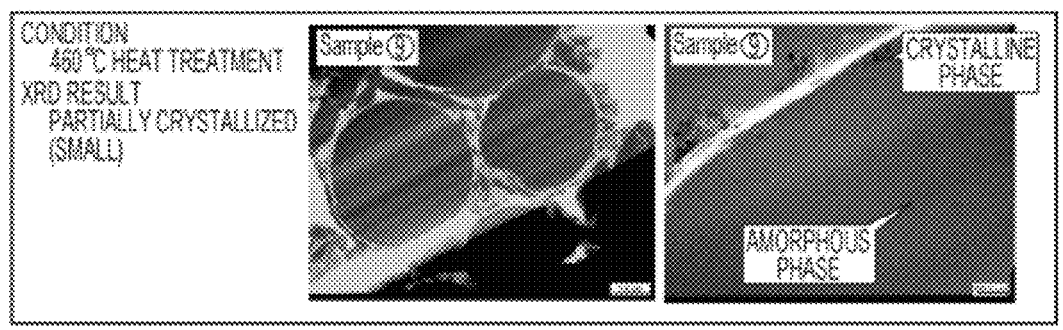
FIG. 14 shows TEM photographs further enlarging FIG. 13A.

As shown in FIGS. 12, 13A, and 14, it was found that during heating to 460° C., Fe-based soft magnetic alloy powder had a mixed-phase structure in which an amorphous phase and an α-Fe crystal phase were mixed. In addition, the precipitation amount of the α-Fe crystal phase was 8 to 15% to the structure of the Fe-based soft magnetic alloy powder. Moreover, the diameter (average) of a crystallite of the α-Fe crystal phase shown in FIG. 13A was about 35 to 40 nm.

On the other hand, as shown in FIG. 13B, during heating to 480° C., the precipitation amount of the crystal phase was increased up to about 40 to 45%. It was thought the crystal phase was mainly the α-Fe crystal phase as shown in the electron diffraction pattern shown in FIG. 13B, However, it was found that since the crystal phase became too much and other compound phases were precipitated, as shown in FIG. 11, the core loss was rapidly increased.

Even in the dust core C, as shown in FIG. 11, it was found that the core loss became smallest in a mixed-phase structure in which an α-Fe crystal phase was slightly precipitated in the amorphous phase of the Fe-based soft magnetic alloy.

XRD Measurement Result on Fe-Based Soft Magnetic Alloy A (Ribbon)

Comparative Example

Figure 15:
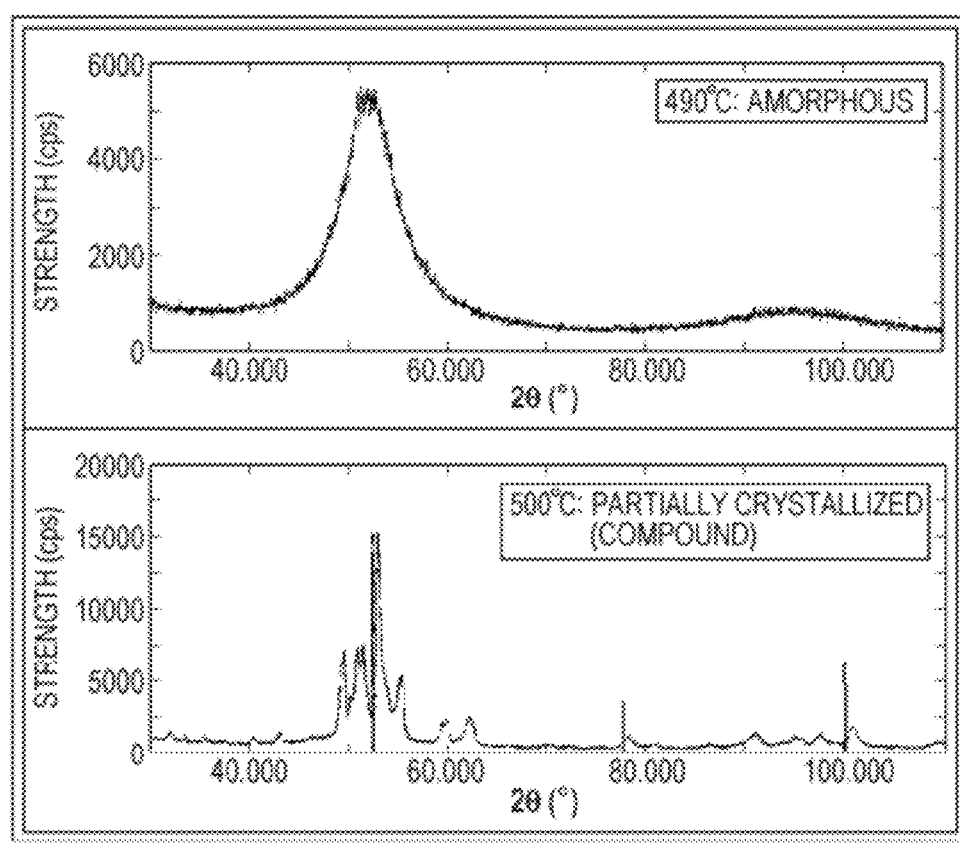
FIG. 15 shows XRD measurement results obtained when an Fe-based soft magnetic alloy A (ribbon) shown in Table 2 is heated to 490° C. and 500° C.

The XRD measurement results obtained when the Fe-based soft magnetic alloy A (ribbon) shown in Table 2 is heated to 490° C. and 500° C. are shown in FIG. 15. As for the heating treatment conditions, the Fe-based soft magnetic alloy A was heated to the heating treatment temperature at a rate of temperature increase of 40° C./min under an N2 gas atmosphere, and when the temperature reached the heating treatment temperature, heated for 30 minutes.

As shown in FIG. 15, it was found that the entire structure was amorphous during heating to 490° C., whereas an Fe compound was precipitated when the heating treatment temperature was 500° C.

XRD Measurement Result on Fe-Based Soft Magnetic Alloy B (Ribbon)

Example

Figure 16:
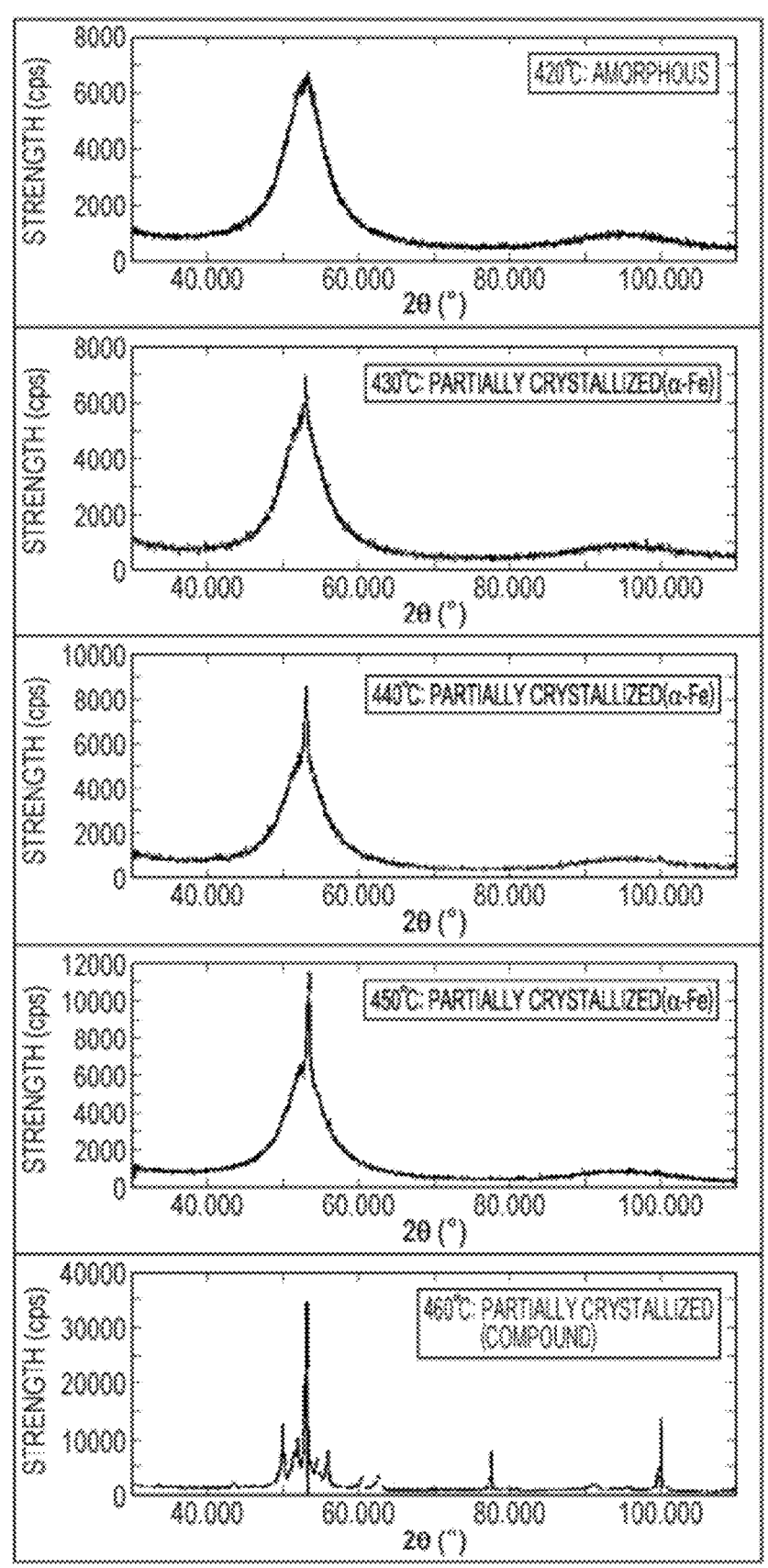
FIG. 16 shows XRD measurement results obtained when an Fe-based soft magnetic alloy B (ribbon) shown in Table 2 is heated to 420° C., 430° C., 440° C., 450° C., and 460° C.

The XRD measurement results obtained when the Fe-based soft magnetic alloy B (ribbon) shown in Table 2 was heated to 420° C., 430° C., 440° C., 450° C., and 460° C. are shown in FIG. 16. As for the heating treatment conditions, the Fe-based soft magnetic alloy B was heated to the heating treatment temperature at a rate of temperature increase of 40° C./min under an N2 gas atmosphere, and when the temperature reached the heating treatment temperature, heated for 30 minutes.

As shown in FIG. 16, it was found that the entire structure was amorphous during heating to 420° C., however, during heating to 430° C. or higher, an α-Fe crystal phase was precipitated, and when the alloy B was further heated to 460° C., an Fe compound was also precipitated. Therefore, in a temperature area of the heating treatment in which only the α-Fe crystal phase was precipitated, when the heating treatment was performed in this area, an Fe-based soft magnetic alloy having excellent magnetic characteristics could be expected to be obtained.

XRD Measurement Result on Fe-Based Soft Magnetic Alloy C (Ribbon)

Example

Figure 17:
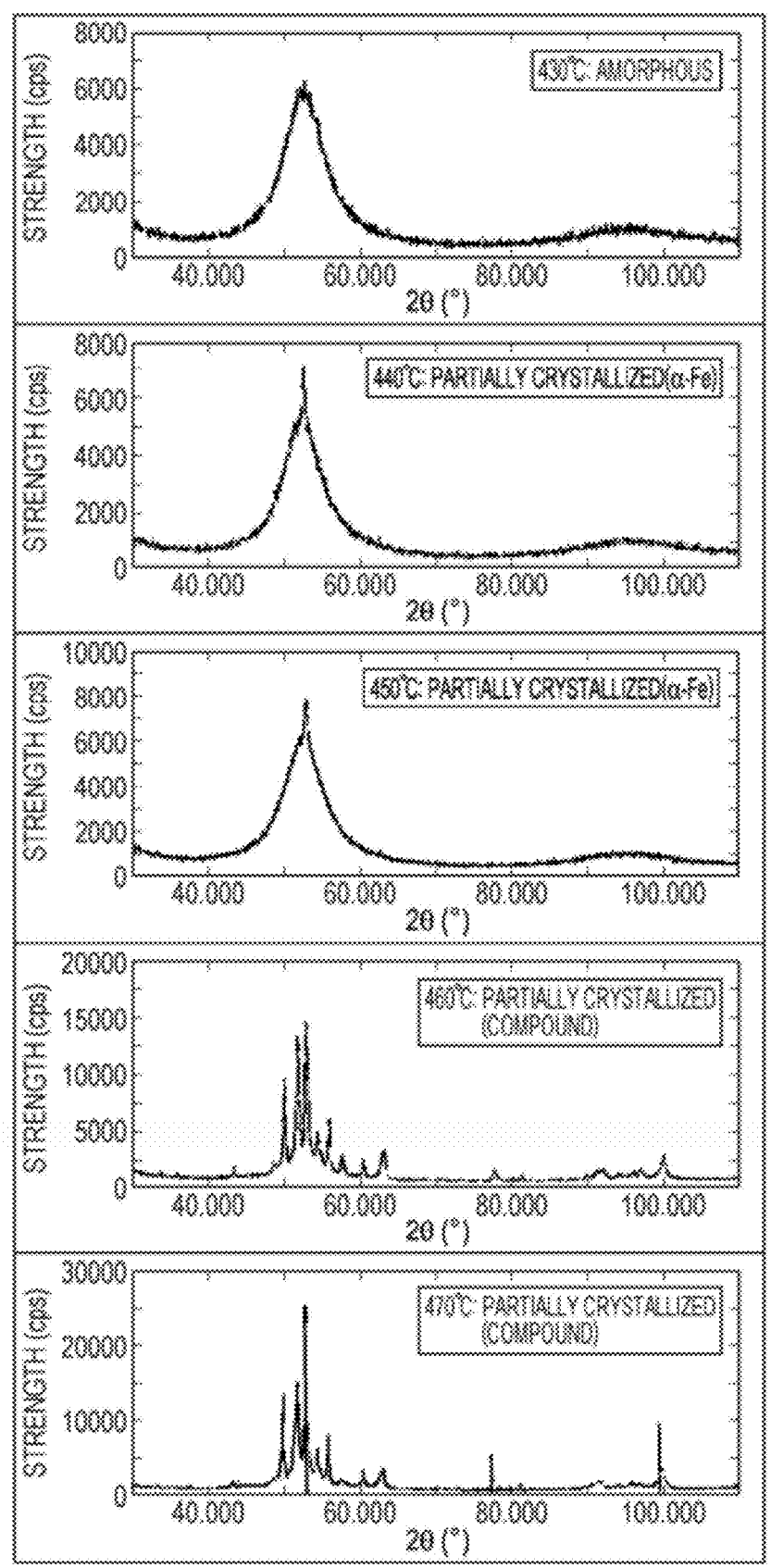
FIG. 17 shows XRD measurement results obtained when an Fe-based soft magnetic alloy C (ribbon) shown in Table 2 is heated to 430° C., 440° C., 450° C., 460° C., and 470° C.

The XRD measurement results obtained when the Fe-based soft magnetic alloy C (ribbon) shown in Table 2 was heated to 430° C., 440° C., 450° C., 460° C., and 470° C. are shown in FIG. 17. As for the heating treatment conditions, the Fe-based soft magnetic alloy C was heated to the heating treatment temperature at a rate of temperature increase of 40° C./min under an N2 gas atmosphere, and when the temperature reached the heating treatment temperature, heated for 1 hour.

As shown in FIG. 17, it was found that the entire structure was amorphous during heating to 430° C., however, during heating to 440° C. or higher, an α-Fe crystal phase was precipitated, and when the alloy C was further heated to 470° C., an Fe compound was also precipitated. Therefore, in a temperature area of the heating treatment in which only the α-Fe crystal phase was precipitated, when the heating was performed in this area, an Fe-based soft magnetic alloy having excellent magnetic characteristics could be expected to be obtained.

(Relationships Between Diameters of Crystallites of Dust Cores B and C, Crystallization Ratio (Volume Fraction), and Core Characteristics)

Figure 18:
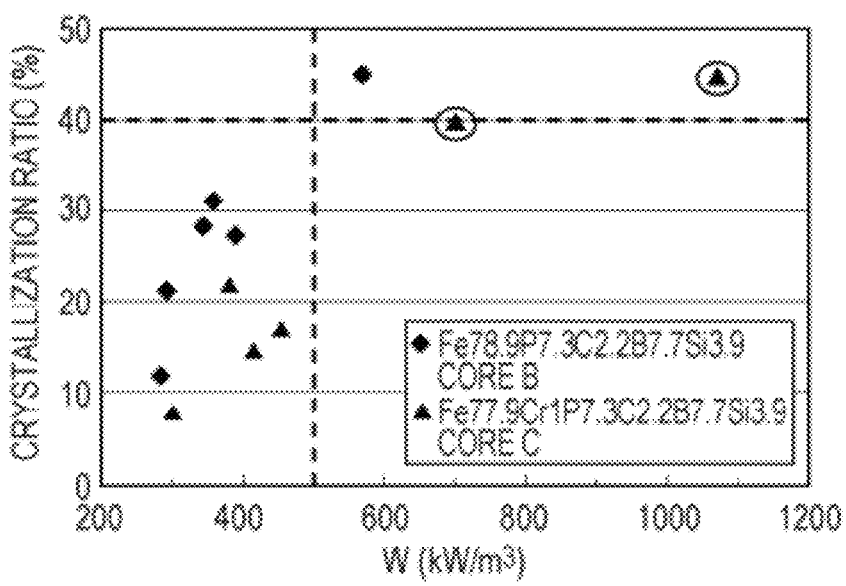
FIG. 18 shows measurement results of a relationship between core loss and crystallization ratio which is changed by varying heating treatment temperature with regard to the compositions of the dust cores B and C shown in Table 5.
Figure 19:
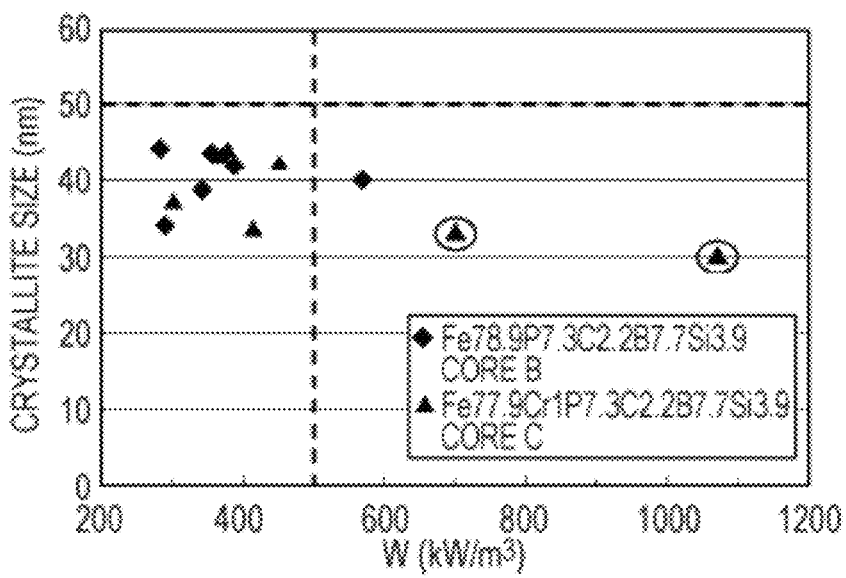
FIG. 19 shows measurement results of a relationship between core loss and average diameter of a crystallite which is changed by varying heating treatment temperature with regard to the compositions of the dust cores B and C shown in Table 5.

Relationships between the diameters (average) of crystallites of the dust cores B and C when the heating treatment temperatures thereof are changed, crystallization ratios (volume fractions), and core losses are shown in Table 5 and FIGS. 18 and 19. As for the heating treatment conditions, the dust cores B and C were heated to the heating treatment temperature at a rate of temperature increase of 40° C./min under an N2 gas atmosphere, and when the temperature reached the heating treatment temperature, heated for 1 hour. The average diameters of the crystallites and the crystallization ratios were obtained by XRD.

and the Fe-based soft magnetic alloy was formed into a powder form by a water atomizing method. Powder characteristics are shown in Table 6 as follows.

TABLE 6

<Powder Characteristics>

| Alloy No. | Composition | Structure | $D_{10}$ (μm) | $D_{50}$ (μm) | $D_{90}$ (μm) | σs (×10$^{-6}$ Wbm/kg) |
|---|---|---|---|---|---|---|
| 48 | $Fe_{80}Cr_1B_{13}Si_6$ | Amorphous | 11.7 | 18.93 | 29.83 | 212/(1.57 T) |

TABLE 5

[Relationships between Crystallites Size obtained by XRD of Each Powder Dust Core, Crystallization Ratio, and Core Characteristics]

| | Heat treatment temperature (° C.) | Core loss (kW/m³)$_{(100 kHz, 100 mT)}$ | Average crystallite diameter (nm) | Crystallization Ratio (volume %) |
|---|---|---|---|---|
| $Fe_{78.9}P_{7.3}C_{2.2}B_{7.7}Si_{3.9}$ Core B | 450 | 284 | 44.7 | 11.8 |
| | | 292 | 34.7 | 21.3 |
| | 460 | 344 | 39.3 | 28.4 |
| | | 389 | 42.6 | 27.4 |
| | 470 | 358 | 44.2 | 31 |
| | | 568 | 40.1 | 45.2 |
| $Fe_{77.9}Cr_1P_{7.3}C_{2.2}B_{7.7}Si_{3.9}$ Core C | 460 | 415 | 34.7 | 14.7 |
| | | 302 | 37.9 | 7.9 |
| | 470 | 450 | 43 | 17.1 |
| | | 381 | 44.2 | 21.7 |
| | 480 | 1072 | 30.4 | 45.3 |
| | | 699 | 34 | 40.2 |

Italic type: Fe compound is also precipitated in addition to α-Fe.

As shown in Table 5 and FIGS. 18 and 19, it was found that since the average diameter of crystallites ranged from 34.7 to 44.7 nm, the crystallization ratio ranges from 7.9 to 31%, and the core loss was lower than 500 kW/m³, and good magnetic characteristics were provided. In addition, it was found that when the diameter of the crystallite was equal to or smaller than 34 nm and the crystallization ratio exceeded 40%, the core loss was rapidly degraded.

Experiment on Fe-based Soft Magnetic Alloy D and Dust Core D

Example

Next, an Fe-based soft magnetic alloy of No. 48 in Table 1 was formed into a ribbon form by a liquid quenching method, Moreover, the Fe-based soft magnetic alloy in the powder form shown in Table 6 was not subjected to the heating treatment.

Subsequently, a dust core was formed using the Fe-based soft magnetic alloy powder shown in Table 6.

The Fe-based soft magnetic alloy powder shown in Table 6, silicone resin (1.4 mass %), and zinc stearate (0.3 mass %) were mixed, dried, and ground, the resultant was sifted to 300 to 850 μm using a sifter having an opening of 300 μm and an opening of 850 μm so as to form granulated powder, the granulated powder was formed into a core precursor having a ring form with an outside diameter of 20 mm, an inside diameter of 12 mm, and a height of 6.8 mm under a press pressure 20 t/cm2, and the core precursor was heated to 440° C. at a rate of temperature increase of 40° C./min under an N2 gas atmosphere for 1 hour, thereby obtaining the dust core.

In addition, core loss, magnetic permeability, and DC-superposed characteristics (μ5500 A/m) of the dust core were measured. The experimental results thereof are shown in Table 7.

TABLE 7

<Dust Core Characteristics>

| Alloy No. | Composition | Core loss (kW/m³)$_{(100 kHz, 100 mT)}$ | Magnetic permeability μ$_{(100 kHz)}$ | DC-superposed characteristics μ$_{(5500 A/m)(100 kHz)}$ | Heat treatment temperature (° C.) |
|---|---|---|---|---|---|
| 48 | $Fe_{80}Cr_1B_{13}Si_6$ | 479 | 52.26 | 31.59 | 440 |

As shown in Table 7, it was found that the core loss could be equal to or lower than 500 kW/m³, and high DC-superposed characteristics are obtained.

Figure 20:
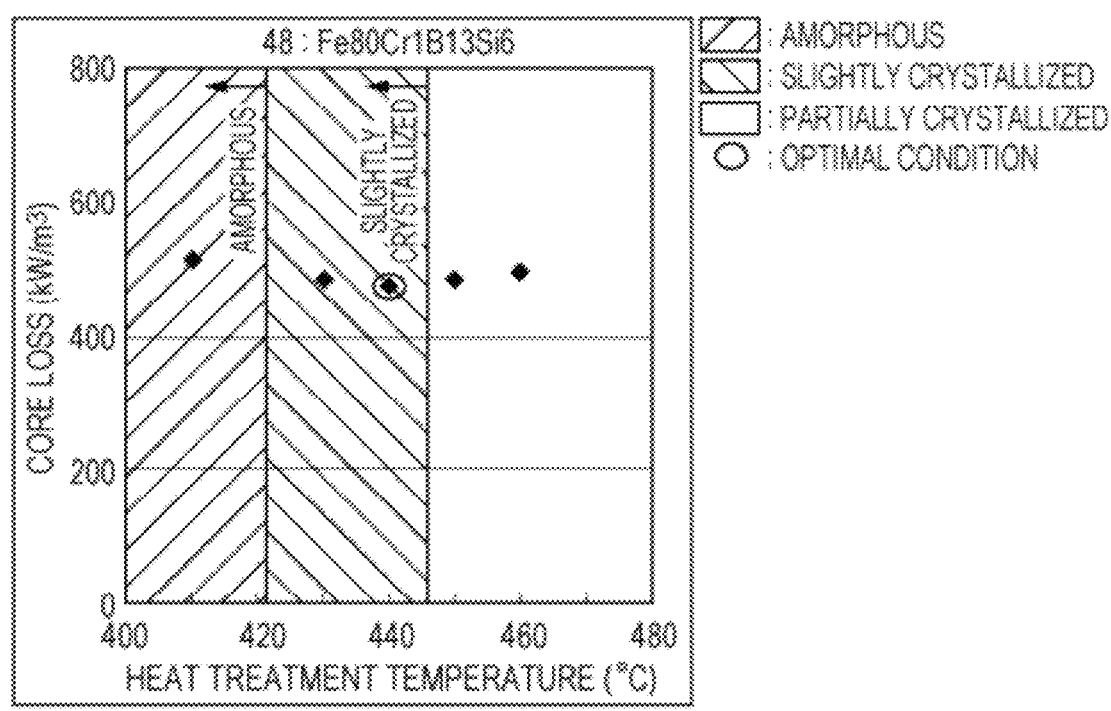
FIG. 20 shows a relationship between heating treatment temperature and core loss with regard to a dust core D using a sample of No. 48 in Table 1.

Next, a heating treatment at another temperature was performed on the dust core D (Example), and the relationship between the heating treatment temperature and the core loss was measured. The experimental results are shown in Table 8 and FIG. 20. As for the heating treatment conditions, the dust core D was heated to the heating treatment temperature at a rate of temperature increase of 40° C./min under an $N_2$ gas atmosphere, and when the temperature reached the heating treatment temperature, heated for 1 hour.

TABLE 8

| Alloy No.: Composition | Heat treatment temperature (° C.) Core loss (kW/m³) at 100 kHz,100 mT | | | | | |
|---|---|---|---|---|---|---|
|  | 410 | 430 | 440 | 450 | 460 | 470 |
| 48: $Fe_{80}Cr_1B_{13}Si_6$ | 517 | 487 | 479 | 488 | 499 | 887 |

Figure 21:
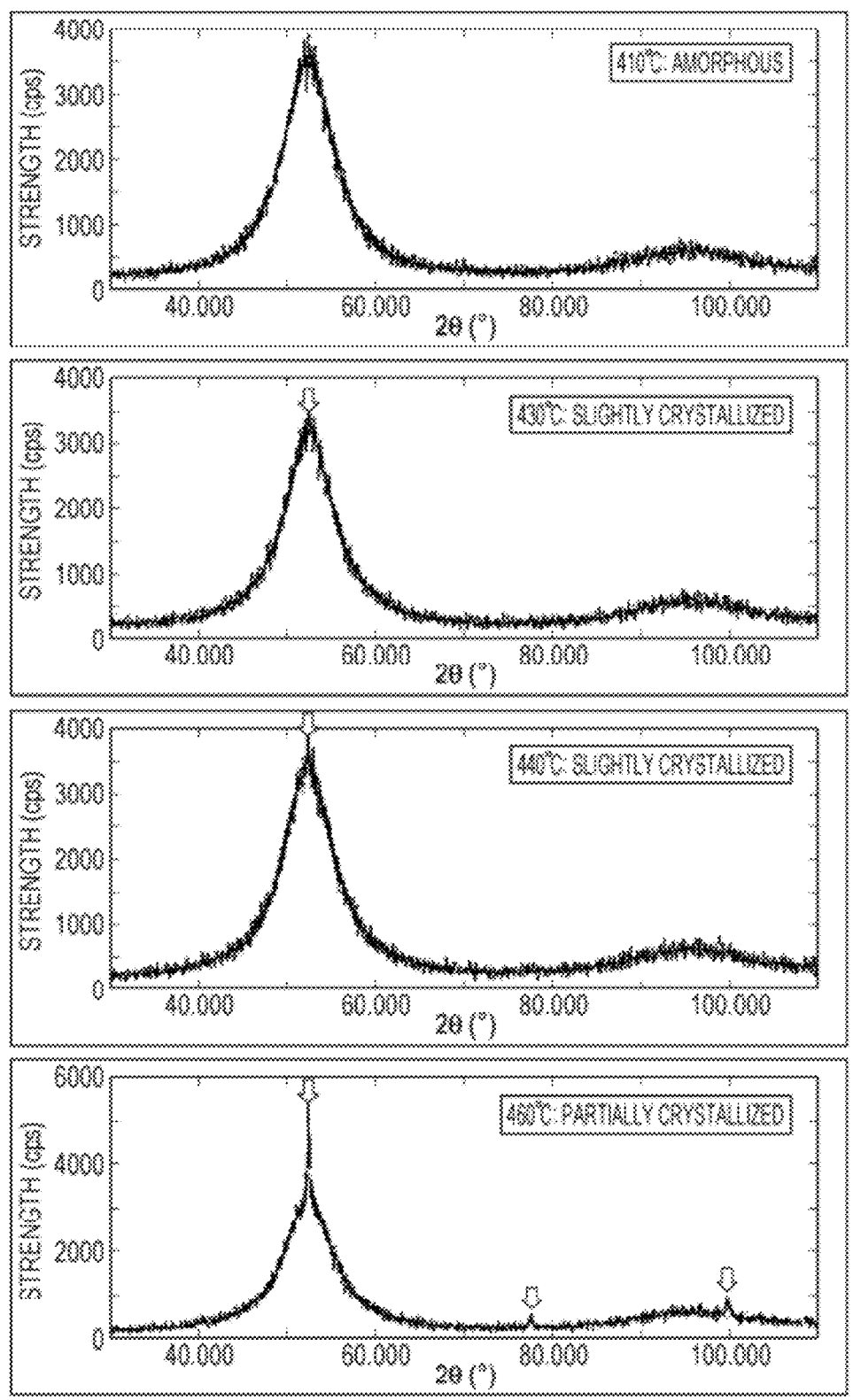
FIG. 21 shows XRD measurement results obtained when the alloy of No. 48 in Table 1 is heated to 410° C., 430° C., 440° C., and 460° C.

In addition, FIG. 21 shows XRD measurement results obtained when a heating treatment is performed on the Fe-based soft magnetic alloy D (ribbon). As shown in FIG. 21, it was found that the entire structure was amorphous during heating to 410° C., however, during heating to 430° C. or higher, an α-Fe crystal phase was precipitated, and when the alloy D was further heated to 460° C., an Fe compound was also precipitated. Therefore, in a temperature area of the heating treatment in which only the α-Fe crystal phase was precipitated, when the heating treatment was performed in this area, an Fe-based soft magnetic alloy having excellent magnetic characteristics could be expected to be obtained.

Experiment on Fe-Based Soft Magnetic Alloy E

Figure 22:
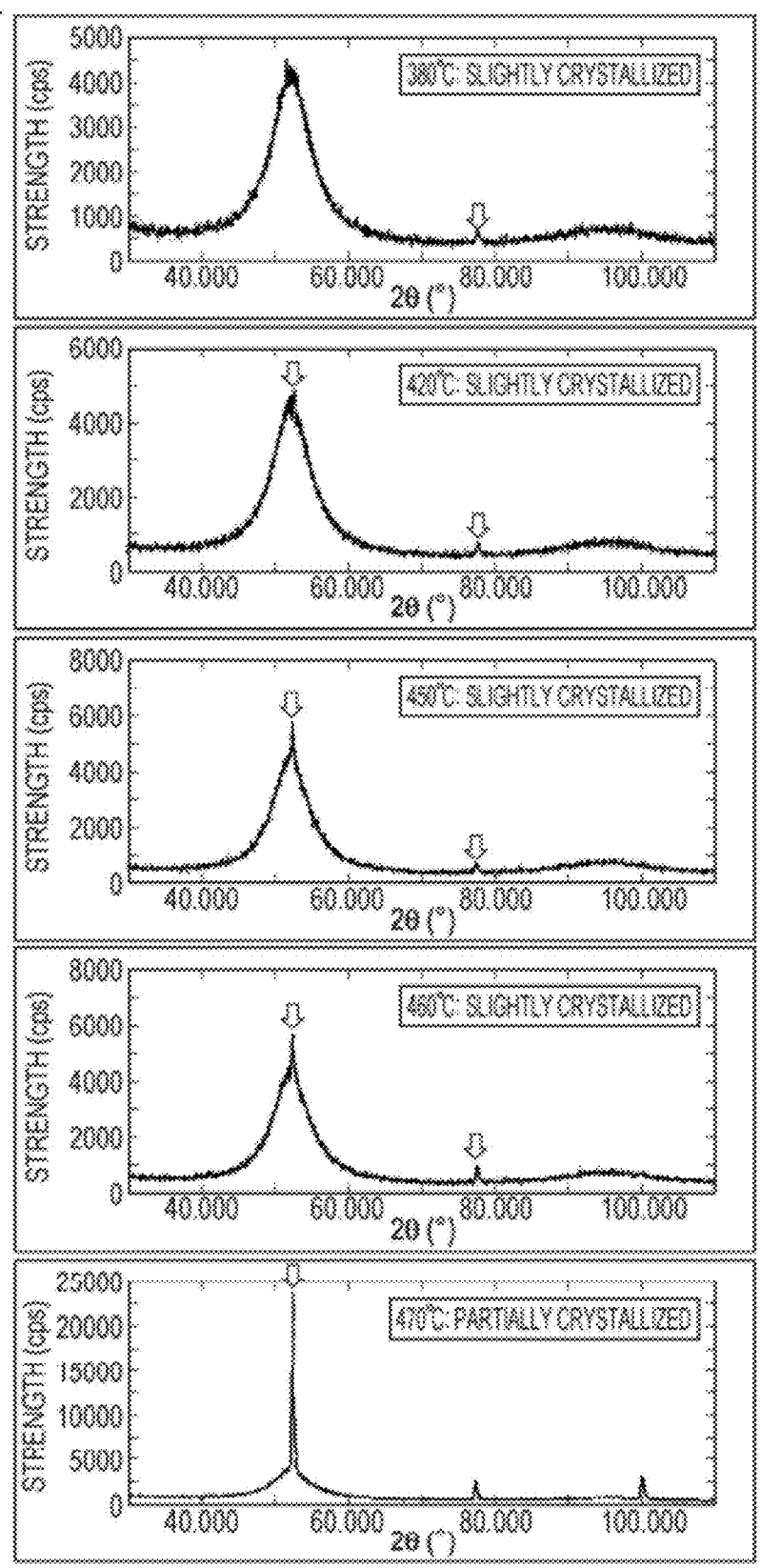
FIG. 22 shows XRD measurement results obtained when the alloy of No. 21 in Table 1 is heated to 380° C., 420° C., 450° C., 460° C., and 470° C.

Next, XRD measurement results obtained using the Fe-based soft magnetic alloy E (ribbon) of No. 21 in Table 1 are shown in FIG. 22. The measurement conditions are the same as those described above.

The Fe-based soft magnetic alloy E was in a state in which an α-Fe crystal phase was precipitated in an amorphous phase in an athermal-treated state (as-Q). It was found that when a heat treatment was performed thereon, precipitation of the α-Fe crystal phase was significantly shown, and when the α-Fe crystal phase was precipitated at a heat treatment temperature of up to about 460° C., most of the crystal phase was the α-Fe crystal phase.

It was found that when the heat treatment temperature was equal to or higher than 470° C., an Fe compound was also precipitated. Therefore, even in the Fe-based soft magnetic alloy E, only the α-Fe crystal phase could be properly precipitated. In addition, a temperature difference of equal to or greater than 20° C. between the precipitation temperature of the α-Fe crystal phase and the precipitation temperature of the Fe compound could be provided, so that an Fe-based soft magnetic alloy having excellent magnetic characteristics could be expected to be obtained.

It should be understood by those skilled in the art that various modifications, combinations, sub-combinations and alterations may occur depending on design requirements and other factors insofar as they are within the scope of the appended claims of the equivalents thereof.

APPENDIX

TABLE 1

| Alloy No. | Composition | Tc (K) | Tg (K) | Tx (K) | ΔTx (K) | Tm (K) | Tg/Tm | Tx/Tm | σs (×10⁻⁶ Wbm/kg) | Precipitation temperature (° C.) α-Fe | Iron compound | O-OK X-NG | Note |
|---|---|---|---|---|---|---|---|---|---|---|---|---|---|
| 1 | $Fe_{77.4}P_{7.3}C_{2.2}B_{7.7}Si_{5.4}$ | 647 | 752 | 796 | 44 | 1355 | 0.555 | 0.587 | 207/(1.51 T) | 450 | 490 | O | |
| 2 | $Fe_{78.4}P_{7.47}C_{2.25}B_{7.89}Si_{3.99}$ | 636 | — | 786 | — | 1329 | — | 0.591 | 211/(1.54 T) | 410 | 460 | O | |
| 3 | $Fe_{78.9}P_{7.3}C_{2.2}B_{7.7}Si_{3.9}$ | 646 | 754 | 790 | 36 | 1332 | 0.566 | 0.593 | 211/(1.54 T) | 430 | 460 | O | |
| 4 | $Fe_{79.4}P_{7.13}C_{2.15}B_{7.51}Si_{3.81}$ | 631 | — | 772 | — | 1324 | — | 0.583 | 212/(1.54 T) | 420 | 450 | O | |
| 5 | $Fe_{78.9}P_{7.3}C_{2.2}B_{7.7}Si_{3.9}$ | 643 | 749 | 791 | 42 | 1331 | 0.563 | 0.594 | 215/(1.57 T) | 430 | 460 | O | |
| 6 | $Fe_{78.9}P_{5.3}C_{2.2}B_{7.7}Si_{3.9}$ | 648 | — | 767 | — | 1328 | — | 0.577 | 216/(1.57 T) | 420 | 500 | O | |
| 7 | $Fe_{78.9}P_{5.3}C_{2.2}B_{8.7}Si_{4.9}$ | 648 | — | 772 | — | 1356 | — | 0.569 | 217/(1.58 T) | 420 | 500 | O | |
| 8 | $Fe_{78.9}P_{5.3}C_{2.2}B_{10.7}Si_{2.9}$ | 655 | 747 | 779 | 32 | 1362 | 0.548 | 0.572 | 220/(1.60 T) | 420 | 450 | O | |
| 9 | $Fe_{78.9}P_{8.3}C_{2.2}B_{7.7}Si_{1.9}$ | 622 | 742 | 760 | 18 | 1341 | 0.553 | 0.567 | 210/(1.53 T) | — | 440 | X | |
| 10 | $Fe_{78.9}P_{7.3}C_{2.2}B_{9.7}Si_{1.9}$ | 634 | 744 | 765 | 21 | 1368 | 0.544 | 0.559 | 215/(1.56 T) | 420 | 450 | O | |
| 11 | $Fe_{78.9}P_{9.3}C_{2.2}B_{5.7}Si_{3.9}$ | 621 | 737 | 767 | 30 | 1305 | 0.565 | 0.588 | 200/(1.46 T) | 440 | 450 | X | |
| 12 | $Fe_{78.9}P_{5.3}C_{2.2}B_{9.7}Si_{3.9}$ | 646 | — | 787 | — | 1359 | — | 0.579 | 210/(1.53 T) | 440 | 460 | O | |
| 13 | $Fe_{78.9}P_{8.3}C_{2.2}B_{7.7}Si_{2.9}$ | 626 | 740 | 774 | 34 | 1340 | 0.552 | 0.578 | 210/(1.53 T) | 430 | 450 | O | |
| 14 | $Fe_{78.9}P_{7.3}C_{2.2}B_{6.7}Si_{4.9}$ | 633 | — | 769 | — | 1322 | — | 0.582 | 210/(1.53 T) | 430 | 460 | O | |
| 15 | $Fe_{78.9}P_{2.3}C_{4.2}B_{11.7}Si_{2.9}$ | 658 | 745 | 782 | 37 | 1384 | 0.538 | 0.565 | 222/(1.62 T) | 410 | 460 | O | |
| 16 | $Fe_{78.9}P_{3.3}C_{3.2}B_{11.7}Si_{2.9}$ | 655 | 741 | 782 | 40 | 1366 | 0.542 | 0.572 | 219/(1.59 T) | 430 | 450 | O | |
| 17 | $Fe_{78.9}P_{6.3}C_{2.2}B_{7.7}Si_{4.9}$ | 641 | — | 771 | — | 1330 | — | 0.58 | 211/(1.54 T) | 440 | 460 | O | |
| 18 | $Fe_{78.9}P_{5.3}C_{2.2}B_{11.7}Si_{1.9}$ | 638 | — | 774 | — | 1376 | — | 0.563 | 220/(1.60 T) | 430 | 460 | O | |
| 19 | $Fe_{78.9}P_{3.3}C_{2.2}B_{11.7}Si_{3.9}$ | 661 | — | 794 | — | 1381 | — | 0.614 | 223/(1.62 T) | 440 | 460 | O | |
| 20 | $Fe_{78.9}P_{2.3}C_{2.2}B_{10.7}Si_{5.9}$ | 665 | — | 810 | — | 1397 | — | 0.58 | 222/(1.62 T) | 430 | 490 | O | |
| 21 | $Fe_{78.9}P_{2.3}C_{2.2}B_{7.7}Si_{8.9}$ | 664 | — | 791 | — | 1245 | — | 0.635 | — | — | 470 | O | Only αFe is precipitated in as-Q state |
| 22 | $Fe_{78.9}P_{4.3}C_{2.2}B_{6.7}Si_{8.9}$ | 647 | — | 785 | — | 1324 | — | 0.593 | 220/(1.60 T) | 420 | 460 | O | |
| 23 | $Fe_{78.9}P_{3.3}C_{2.2}B_{14.7}Si_{0.9}$ | 658 | — | 766 | — | 1416 | — | 0.541 | 220/(1.60 T) | 430 | 440 | X | |
| 24 | $Fe_{78.9}P_{0.3}C_{2.2}B_{16.7}Si_{1.9}$ | 677 | — | 779 | — | 1436 | — | 0.543 | 225/(1.64 T) | 440 | 460 | O | |
| 25 | $Fe_{78.9}P_{0.3}C_{2.2}B_{10.7}Si_{7.9}$ | 674 | — | 795 | — | 1424 | — | 0.558 | 224/(1.63 T) | 400 | 470 | O | |
| 26 | $Fe_{78.9}P_{0.3}C_{2.2}B_{13.7}Si_{4.9}$ | 679 | — | 802 | — | 1431 | — | 0.56 | 226/(1.64 T) | 420 | 490 | O | |
| 27 | $Fe_{77.9}Al_1P_{7.3}C_{2.2}B_{7.7}Si_{3.9}$ | 646 | 754 | 790 | 36 | 1332 | 0.566 | 0.593 | 211/(1.53 T) | 460 | 470 | X | Al 1 at % added |
| 28 | $Fe_{77.9}Mo_1P_{7.3}C_{2.2}B_{7.7}Si_{3.9}$ | 601 | 751 | 787 | 36 | 1319 | 0.569 | 0.597 | 200/(1.45 T) | — | 470 | X | Mo 1 at % added |

TABLE 1-continued

| Alloy No. | Composition | Tc (K) | Tg (K) | Tx (K) | ΔTx (K) | Tm (K) | Tg/Tm | Tx/Tm | σs (×10⁻⁶ Wbm/kg) | Precipitation temperature (° C.) α-Fe | Precipitation temperature (° C.) Iron compound | O-OK X-NG | Note |
|---|---|---|---|---|---|---|---|---|---|---|---|---|---|
| 29 | $Fe_{77.9}Nb_1P_{7.3}C_{2.2}B_{7.7}Si_{3.9}$ | 616 | 753 | 791 | 38 | 1329 | 0.567 | 0.595 | 204/(1.47 T) | 460 | 470 | X | Nb 1 at % added |
| 30 | $Fe_{77.9}Cr_1P_{7.3}C_{2.2}B_{7.7}Si_{3.9}$ | 614 | 746 | 788 | 42 | 1338 | 0.558 | 0.589 | 202/(1.46 T) | 440 | 460 | O | Cr 1 at % added |
| 31 | $Fe_{76.9}Co_2P_{7.3}C_{2.2}B_{7.7}Si_{3.9}$ | 646 | 741 | 773 | 32 | 1329 | 0.558 | 0.582 | 213/(1.55 T) | 440 | 460 | O | Co 2 at % added |
| 32 | $Fe_{74.9}Co_4P_{7.3}C_{2.2}B_{7.7}Si_{3.9}$ | 658 | 731 | 771 | 39 | 1318 | 0.555 | 0.584 | 211/(1.53 T) | 420 | 470 | O | Co 4 at % added |
| 33 | $Fe_{75.9}Ni_3P_{3.3}C_{4.2}B_{10.7}Si_{2.9}$ | 668 | 746 | 779 | 33 | 1363 | 0.547 | 0.572 | 217/(1.57 T) | 430 | 450 | O | Ni 3 at % added |
| 34 | $Fe_{72.9}Ni_8P_{3.3}C_{4.2}B_{10.7}Si_{2.9}$ | 675 | 735 | 768 | 33 | 1368 | 0.537 | 0.561 | 211/(1.57 T) | 410 | 440 | O | Ni 6 at % added |
| 35 | $Fe_{83}B_{17}$ | 602 | — | 740 | — | 1452 | — | 0.51 | 221/(1.66 T) | 370 | 410 | O | |
| 36 | $Fe_{83}B_{15}Si_2$ | 610 | — | 737 | — | 1452 | — | 0.508 | 224/(1.67 T) | 380 | 460 | O | |
| 37 | $Fe_{78}B_{10}Si_{12}$ | 684 | — | 793 | — | 1466 | — | 0.541 | 218/(1.59 T) | 450 | 460 | X | |
| 38 | $Fe_{80}B_{13}Si_7$ | 661 | — | 787 | — | 1453 | — | 0.542 | 227/(1.67 T) | 400 | 460 | O | |
| 39 | $Fe_{81}B_{11}Si_9$ | 644 | — | 754 | — | 1451 | — | 0.52 | 226/(1.67 T) | — | 380 | X | |
| 40 | $Fe_{78}B_{12}Si_{10}$ | 689 | — | 812 | — | 1439 | — | 0.564 | 218/(1.56 T) | 470 | 500 | O | |
| 41 | $Fe_{81}B_{12}Si_7$ | 644 | — | 763 | — | 1454 | — | 0.525 | 226/(1.67 T) | 380 | 450 | O | |
| 42 | $Fe_{79}B_{12}Si_9$ | 675 | — | 793 | — | 1443 | — | 0.55 | 225/(1.67 T) | 440 | 470 | O | |
| 43 | $Fe_{80}B_{15}Si_5$ | 658 | — | 789 | — | 1457 | — | 0.542 | 230/(1.67 T) | 420 | 470 | O | |
| 44 | $Fe_{75}B_{15}Si_{10}$ | 717 | — | 843 | — | 1505 | — | 0.56 | 222/(1.61 T) | 490 | 520 | O | |
| 45 | $Fe_{86}B_{12}Si_2$ | | | | | | | | | | — | X | |
| 46 | $Fe_{70}B_5Si_{24}$ | 657 | — | 791 | — | 1443 | — | 0.548 | 186/(1.3 T) | — | 420 | X | |
| 47 | $Fe_{80}B_{11}Si_9$ | 662 | — | 774 | — | 1447 | — | 0.535 | 228/(1.69 T) | 410 | 430 | O | |
| 48 | $Fe_{80}Cr_1B_{13}Si_6$ | 606 | — | 771 | — | 1461 | — | 0.528 | 216/(1.60 T) | 390 | 450 | O | Cr 1 at % added |
| 49 | $Fe_{78}P_8B_{12}Nb_2$ | 545 | 761 | 790 | 29 | 1379 | 0.552 | 0.573 | 183/(1.39 T) | 450 | 470 | O | |
| 50 | $Fe_{78}P_6B_{14}Nb_2$ | 573 | 764 | 793 | 29 | 1396 | 0.547 | 0.568 | 190/(1.40 T) | 440 | 480 | O | |
| 51 | $Fe_{78}P_{10}B_{10}Nb_2$ | 558 | 749 | 774 | 25 | 1378 | 0.544 | 0.562 | 183/(1.39 T) | 440 | 460 | O | |
| 52 | $Fe_{75}P_8B_{15}Nb_2$ | 587 | 780 | 809 | 29 | 1392 | 0.56 | 0.581 | 182/(1.33 T) | — | 490 | X | |
| 53 | $Fe_{75}P_{13}B_{10}Nb_2$ | 556 | 768 | 799 | 31 | 1391 | 0.552 | 0.574 | 172/(1.27 T) | — | 480 | X | |
| 54 | $Fe_{80}P_6B_{12}Nb_2$ | 548 | 746 | 776 | 30 | 1372 | 0.544 | 0.566 | 192/(1.40 T) | 430 | 470 | O | |
| 55 | $Fe_{79}P_{11}B_8Nb_2$ | 539 | 742 | 771 | 29 | 1350 | 0.55 | 0.571 | 180/(1.35 T) | 440 | 470 | O | |
| 56 | $Fe_{77}P_8B_{12}Nb_2Cr_1$ | 540 | 763 | 791 | 28 | 1385 | 0.551 | 0.571 | 173/(1.33 T) | 450 | 470 | O | |
| 57 | $Fe_{76}Si_9B_{10}P_5$ | 670 | 787 | 831 | 44 | 1351 | 0.583 | 0.615 | 205/(1.45 T) | 500 | 510 | X | |
| 58 | $Fe_{75}Cr_1Si_9B_{10}P_5$ | 644 | 789 | 834 | 45 | 1356 | 0.582 | 0.615 | 195/(1.36 T) | 500 | 510 | X | |
| 59 | $Fe_{73.72}Cr_{2.28}Si_{11}B_{11}C_2$ | 640 | — | 640 | — | 1475 | — | 0.569 | 197/(1.43 T) | 500 | 520 | O | |

What is claimed is:

1. An Fe-based soft magnetic alloy consisting of:
Fe; and
a component R,
wherein the component R is at least one element selected from the group consisting of P, C, B, and Si,
there is a temperature difference of equal to or greater than 20° C. between a precipitation temperature of an α-Fe crystal phase and a precipitation temperature of an Fe compound,
the Fe-based soft magnetic alloy is formed of a mixed-phase structure in which an amorphous phase and the α-Fe crystal phase are mixed,
a diameter of a crystallite of the α-Fe crystal phase is equal to or smaller than 50 nm, and a volume fraction of the α-Fe crystal phase to a total is equal to or smaller than 40%,
a composition formula is represented by $Fe_{100-x-u}J_xR_u$,
a component J is at least one element selected from the group consisting of Cr, Co, Ni, and Nb, and
x and u representing composition ratios satisfy: 0 at % ≦ x ≦ 6 at %, 17 at % ≦ u ≦ 25 at %, and 17 at % ≦ x+u ≦ 27.1 at %.

2. The Fe-based soft magnetic alloy according to claim 1, wherein the composition formula is represented by $Fe_{100-x-y-z-w-t}J_xP_yC_zB_wSi_t$, and v, z, w, and t representing composition ratios satisfy: 0 at % ≦ y ≦ 11 at %, 0 at % ≦ z ≦ 4.2 at %, 5.7 at % ≦ w ≦ 17 at %, 0 at % ≦ t ≦ 11 at %, and 17 at % ≦ x+y+z+w+t ≦ 27.1 at %.

3. The Fe-based soft magnetic alloy according to claim 2, wherein the Fe-based soft magnetic alloy consists of:
Fe;
a component M which is at least one element selected from the group consisting of Cr, Co, and Ni; and
P, C, B, and Si,
the composition formula is represented by $Fe_{100-x-y-z-w-t}M_xP_yC_zB_wSi_t$, and
x, y, z, w, and t representing composition ratios satisfy: 0 at % ≦ x ≦ 6 at %, 0.3 at % ≦ y ≦ 8.3 at %, 2.15 at % ≦ z ≦ 4.2 at %, 5.7 at % ≦ w ≦ 16.7 at %, 1.9 at % ≦ t ≦ 8.9 at %, and 72.9 at % ≦ 100−x−y−z−w−t ≦ 79.4 at %.

4. The Fe-based soft magnetic alloy according to claim 3, wherein y, w, and t representing composition ratios satisfy: 0.3 at % ≦ y ≦ 8.3 at %, 6.7 at % ≦ w ≦ 11.7 at %, and 1.9 at % ≦ t ≦ 5.9 at %.

5. The Fe-based soft magnetic alloy according to claim 2, wherein the composition formula is represented by $Fe_{100-w-t-b}B_wSi_tCr_b$, and
w, t, and b representing composition ratios satisfy: 11 at % ≦ w ≦ 17 at %, 0 at % ≦ t ≦ 10 at %, 0 at % ≦ b ≦ 1 at %, and 75 at % ≦ 100−w−t−b ≦ 83 at %.

6. The Fe-based soft magnetic alloy according to claim 2, wherein the Fe-based soft magnetic alloy consists of includes:
Fe;

a component L which is at least one element selected from the group consisting of Nb and Cr; and P and B, the composition formula is represented by $Fe_{100-y-w-a}P_yB_wL_a$, and y, w, and a representing composition ratios satisfy: 6 at % $\leq$ y $\leq$ 11 at %, 8 at % $\leq$ w $\leq$ 14 at %, 2 at % $\leq$ a $\leq$ 3 at %, and 77 at % $\leq$ 100−y−w−a $\leq$ 80 at %.

7. A dust core comprising:

powder of the Fe-based soft magnetic alloy according to claim 1; and a binding material solidifying the powder.

8. A dust core comprising:

powder of an Fe-based soft magnetic alloy; and a binding material solidifying the powder, wherein the Fe-based soft magnetic alloy consists of:

Fe; and a component R, wherein the component R is at least one element selected from the group consisting of P, C, B, and Si, there is a temperature difference of equal to or greater than 20° C. between a precipitation temperature of an α-Fe crystal phase and a precipitation temperature of an Fe compound, the Fe-based soft magnetic alloy is formed of a mixed-phase structure in which an amorphous phase and the α-Fe crystal phase are mixed, and a diameter of a crystallite of the α-Fe crystal phase is equal to or smaller than 50 nm, and a volume fraction of the α-Fe crystal phase to a total is equal to or lower than 40%.

9. The Fe-based soft magnetic alloy according to claim 1, wherein the volume fraction of the α-Fe crystal phase to the total is equal to or smaller than 20%.

10. The Fe-based soft magnetic alloy according to claim 1, wherein the volume fraction of the α-Fe crystal phase to the total is equal to or smaller than 15%.

11. The Fe-based soft magnetic alloy according to claim 1, wherein the volume fraction of the α-Fe crystal phase to the total is equal to or smaller than 10%.

12. The dust core according to claim 8, wherein the volume fraction of the α-Fe crystal phase to the total is equal to or smaller than 20%.

13. The dust core according to claim 8, wherein the volume fraction of the α-Fe crystal phase to the total is equal to or smaller than 15%.

14. The dust core according to claim 8, wherein the volume fraction of the α-Fe crystal phase to the total is equal to or smaller than 10%.

* * * * *